US012300942B2

(12) United States Patent
Cartier, Jr. et al.

(10) Patent No.: US 12,300,942 B2
(45) Date of Patent: May 13, 2025

(54) VERY HIGH SPEED, HIGH DENSITY ELECTRICAL INTERCONNECTION SYSTEM WITH BROADSIDE SUBASSEMBLIES

(71) Applicant: Amphenol Corporation, Wallingford, CT (US)

(72) Inventors: Marc B. Cartier, Jr., Durham, NH (US); John Robert Dunham, Windham, NH (US); Mark W. Gailus, Concord, MA (US); Donald A. Girard, Jr., Bedford, NH (US); Brian Kirk, Amherst, NH (US); David Levine, Amherst, NH (US); Vysakh Sivarajan, Nashua, NH (US)

(73) Assignee: Amphenol Corporation, Wallingford, CT (US)

( * ) Notice: Subject to any disclaimer, the term of this patent is extended or adjusted under 35 U.S.C. 154(b) by 49 days.

(21) Appl. No.: 18/316,996

(22) Filed: May 12, 2023

(65) Prior Publication Data

US 2024/0014609 A1 Jan. 11, 2024

Related U.S. Application Data

(63) Continuation of application No. 16/858,182, filed on Apr. 24, 2020, now Pat. No. 11,688,980, which is a (Continued)

(51) Int. Cl.
*H01R 13/6598* (2011.01)
*H01R 12/72* (2011.01)
(Continued)

(52) U.S. Cl.
CPC ....... *H01R 13/6598* (2013.01); *H01R 12/724* (2013.01); *H01R 12/737* (2013.01);
(Continued)

(58) Field of Classification Search
CPC ............ H01R 13/6598; H01R 13/6585; H01R 12/724; H01R 12/737; H01R 13/658; H01R 13/6586; H01R 13/6857; H01R 13/6599
See application file for complete search history.

(56) References Cited

U.S. PATENT DOCUMENTS

| | | | |
|---|---|---|---|
| 4,632,476 | A | 12/1986 | Schell |
| 4,806,107 | A | 2/1989 | Arnold et al. |

(Continued)

FOREIGN PATENT DOCUMENTS

| | | | |
|---|---|---|---|
| CN | 2519434 | Y | 10/2002 |
| CN | 101208837 | A | 6/2008 |

(Continued)

OTHER PUBLICATIONS

International Search Report and Written Opinion mailed Apr. 30, 2015 for Application No. PCT/US2015/012542.

(Continued)

*Primary Examiner* — Hae Moon Hyeon
(74) *Attorney, Agent, or Firm* — Wolf, Greenfield & Sacks, P.C.

(57) ABSTRACT

A modular electrical connector with broad-side coupled signal conductors in a right angle intermediate portion. Broadside coupling provides balanced pairs for very high frequency operation. The connector is assembled with multiple subassemblies, each of which has multiple pairs of signal conductors. The subassemblies are formed from an insulative portion having grooves in opposite sides into which the intermediate portions of signal conductors. Covers, holding the signal conductors in the grooves, establish the position of the signal conductors relative to reference conductors at the exterior of subassembly, so as to provide a controlled impedance. Lossy material is positioned between the pairs in a subassembly and/or contacts the (Continued)

reference conductors of the subassemblies, and the lossy material of the subassemblies is in turn connected with a conductive structure.

40 Claims, 18 Drawing Sheets

Related U.S. Application Data continuation of application No. 15/882,720, filed on Jan. 29, 2018, now Pat. No. 10,707,626, which is a continuation of application No. 15/113,371, filed as application No. PCT/US2015/012542 on Jan. 22, 2015, now Pat. No. 9,905,975.

(60) Provisional application No. 62/078,945, filed on Nov. 12, 2014, provisional application No. 61/930,411, filed on Jan. 22, 2014.

(51) Int. Cl.
*H01R 12/73* (2011.01)
*H01R 13/02* (2006.01)
*H01R 13/518* (2006.01)
*H01R 13/6585* (2011.01)
*H01R 13/6587* (2011.01)
*H01R 13/6599* (2011.01)
*H01R 43/24* (2006.01)

(52) U.S. Cl.
CPC ......... *H01R 13/025* (2013.01); *H01R 13/518* (2013.01); *H01R 13/6585* (2013.01); *H01R 13/6587* (2013.01); *H01R 13/6599* (2013.01); *H01R 43/24* (2013.01); *Y10T 29/4922* (2015.01); *Y10T 29/49222* (2015.01)

(56) References Cited

U.S. PATENT DOCUMENTS 4,846,727 A 7/1989 Glover et al.
4,975,084 A 12/1990 Fedder et al.
5,066,236 A 11/1991 Broeksteeg
5,429,520 A 7/1995 Morlion et al.
5,429,521 A 7/1995 Morlion et al.
5,433,617 A 7/1995 Morlion et al.
5,433,618 A 7/1995 Morlion et al.
5,484,310 A 1/1996 McNamara et al.
5,496,183 A 3/1996 Soes et al.
6,116,926 A * 9/2000 Ortega ............... H01R 13/6471 439/857
6,146,202 A 11/2000 Ramey et al.
6,293,827 B1 9/2001 Stokoe
6,299,438 B1 10/2001 Sahagian et al.
6,503,103 B1 * 1/2003 Cohen ................ H01R 13/6474 439/607.09
6,551,140 B2 * 4/2003 Billman ............. H01R 13/6471 439/607.07
6,776,659 B1 8/2004 Stokoe et al.
6,981,883 B2 1/2006 Raistrick et al.
7,163,421 B1 1/2007 Cohen et al.
7,309,257 B1 12/2007 Minich
7,407,413 B2 8/2008 Minich
7,422,483 B2 9/2008 Avery et al.
7,494,383 B2 2/2009 Cohen et al.
7,540,781 B2 6/2009 Kenny et al.
7,581,990 B2 9/2009 Kirk et al.
7,585,168 B2 9/2009 Kato et al.
7,585,186 B2 9/2009 McAlonis et al.
7,588,464 B2 9/2009 Kim
7,604,502 B2 10/2009 Pan
7,690,946 B2 4/2010 Knaub et al.
7,722,401 B2 5/2010 Kirk et al.
7,731,537 B2 6/2010 Amleshi et al.
7,744,414 B2 6/2010 Scherer et al.
7,753,731 B2 7/2010 Cohen et al.
7,771,233 B2 8/2010 Gailus
7,775,802 B2 8/2010 Defibaugh et al.
7,789,676 B2 9/2010 Morgan et al.
7,794,240 B2 9/2010 Cohen et al.
7,794,278 B2 9/2010 Cohen et al.
7,806,729 B2 10/2010 Nguyen et al.
7,811,129 B2 10/2010 Glover et al.
7,871,296 B2 1/2011 Fowler et al.
7,874,873 B2 1/2011 Do et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,955,094 B2 * 6/2011 Lu ...................... H01R 13/6477 439/541.5
7,976,318 B2 7/2011 Fedder et al.
7,985,097 B2 7/2011 Gulla
7,999,192 B2 8/2011 Chan et al.
8,016,616 B2 9/2011 Glover et al.
8,057,267 B2 11/2011 Johnescu
8,083,553 B2 12/2011 Manter et al.
8,100,699 B1 1/2012 Costello
8,167,651 B2 5/2012 Glover et al.
8,182,289 B2 5/2012 Stokoe et al.
8,215,968 B2 7/2012 Cartier et al.
8,216,001 B2 7/2012 Kirk
8,251,745 B2 8/2012 Johnescu
8,272,877 B2 9/2012 Stokoe et al.
8,371,875 B2 2/2013 Gailus
8,371,876 B2 2/2013 Davis
8,382,524 B2 2/2013 Khilchenko et al.
8,398,431 B1 3/2013 Whiteman, Jr. et al.
8,469,745 B2 6/2013 Davis et al.
8,550,861 B2 10/2013 Cohen et al.
8,628,356 B2 1/2014 Laurx et al.
8,641,448 B2 2/2014 Lappoehn
8,657,627 B2 2/2014 McNamara et al.
8,668,522 B2 3/2014 Becker et al.
8,678,860 B2 3/2014 Minich et al.
8,715,003 B2 5/2014 Buck et al.
8,715,005 B2 5/2014 Pan
8,734,167 B2 5/2014 Aimoto
8,771,016 B2 7/2014 Atkinson et al.
8,814,595 B2 * 8/2014 Cohen ................ H01R 13/6473 439/701
8,841,560 B1 9/2014 Roberts
8,864,521 B2 10/2014 Atkinson et al.
8,888,531 B2 * 11/2014 Jeon ..................... H01R 13/658 439/607.07
8,889,999 B2 11/2014 Thurairajaratnam et al.
8,926,377 B2 1/2015 Kirk et al.
8,944,831 B2 2/2015 Stoner et al.
8,998,642 B2 4/2015 Manter et al.
9,004,942 B2 4/2015 Paniauqa
9,022,806 B2 5/2015 Cartier, Jr. et al.
9,028,281 B2 5/2015 Kirk et al.
9,065,230 B2 6/2015 Milbrand, Jr.
9,124,009 B2 9/2015 Atkinson et al.
9,184,530 B2 11/2015 Cohen
9,219,335 B2 12/2015 Atkinson et al.
9,225,085 B2 12/2015 Cartier, Jr. et al.
9,300,074 B2 3/2016 Gailus
9,450,344 B2 9/2016 Cartier, Jr. et al.
9,484,674 B2 11/2016 Cartier, Jr. et al.
9,509,101 B2 11/2016 Cartier, Jr. et al.
9,520,689 B2 12/2016 Cartier, Jr. et al.
9,560,741 B2 1/2017 Rose et al.
9,564,696 B2 2/2017 Gulla
9,608,382 B2 3/2017 McClellan et al.
9,685,736 B2 6/2017 Gailus et al.
9,705,255 B2 7/2017 Atkinson et al.
9,807,869 B2 10/2017 Gailus et al.
9,905,975 B2 2/2018 Cartier, Jr. et al.
10,034,366 B2 7/2018 Gailus et al.
10,122,129 B2 11/2018 Milbrand, Jr. et al.
10,141,676 B2 11/2018 Astbury et al.
10,211,577 B2 2/2019 Milbrand, Jr. et al.

(56) References Cited

U.S. PATENT DOCUMENTS 10,243,304 B2 3/2019 Kirk et al.
10,348,040 B2 7/2019 Cartier, Jr. et al.
10,381,767 B1 8/2019 Milbrand, Jr. et al.
10,431,936 B2 10/2019 Horning et al.
10,455,689 B2 10/2019 Gailus et al.
10,511,128 B2 12/2019 Kirk et al.
10,707,626 B2 7/2020 Cartier, Jr. et al.
10,849,218 B2 11/2020 Gailus et al.
10,879,643 B2 12/2020 Astbury et al.
11,289,830 B2 3/2022 Cartier, Jr. et al.
11,742,601 B2 8/2023 Cartier, Jr. et al.
2002/0168898 A1 11/2002 Billman et al.
2007/0207641 A1 9/2007 Minich
2008/0003879 A1 1/2008 Minich
2008/0214055 A1 9/2008 Gulla
2008/0246555 A1 10/2008 Kirk et al.
2008/0248658 A1 10/2008 Cohen et al.
2008/0248659 A1 10/2008 Cohen et al.
2008/0248660 A1 10/2008 Kirk et al.
2009/0011641 A1 1/2009 Cohen et al.
2009/0011645 A1 1/2009 Laurx et al.
2009/0017681 A1 1/2009 Amleshi et al.
2009/0035955 A1 2/2009 McNamara
2009/0056999 A1 3/2009 Kashiwakura
2009/0061661 A1 3/2009 Shuey et al.
2009/0093158 A1 4/2009 McAlonis et al.
2009/0117386 A1 5/2009 Vacanti et al.
2009/0203259 A1 8/2009 Nguyen et al.
2009/0239395 A1 9/2009 Cohen et al.
2009/0258516 A1 10/2009 Hiew et al.
2009/0291593 A1 11/2009 Atkinson et al.
2009/0305533 A1 12/2009 Feldman et al.
2009/0305553 A1 12/2009 Thomas et al.
2009/0311908 A1 12/2009 Fogg et al.
2010/0015822 A1 1/2010 Morgan et al.
2010/0048058 A1 2/2010 Morgan et al.
2010/0081302 A1 4/2010 Atkinson et al.
2010/0144167 A1 6/2010 Fedder et al.
2010/0144169 A1 6/2010 Glover et al.
2010/0144175 A1 6/2010 Helster et al.
2010/0178779 A1 7/2010 Davis et al.
2010/0197149 A1 8/2010 Davis et al.
2010/0291803 A1 11/2010 Kirk
2010/0291806 A1 11/2010 Minich et al.
2010/0294530 A1 11/2010 Atkinson et al.
2010/0304581 A1 12/2010 Davis et al.
2011/0003509 A1 1/2011 Gailus
2011/0104948 A1 5/2011 Girard, Jr. et al.
2011/0130038 A1 6/2011 Cohen et al.
2011/0212649 A1 9/2011 Stokoe et al.
2011/0212650 A1 9/2011 Amleshi et al.
2011/0230095 A1 9/2011 Atkinson et al.
2011/0230096 A1 9/2011 Atkinson et al.
2011/0256739 A1 10/2011 Toshiyuki et al.
2011/0287663 A1 11/2011 Gailus et al.
2012/0058684 A1 3/2012 De Geest et al.
2012/0077380 A1 3/2012 Minich et al.
2012/0094536 A1 4/2012 Khilchenko et al.
2012/0156929 A1 6/2012 Manter et al.
2012/0184154 A1 7/2012 Frank et al.
2012/0202363 A1 8/2012 McNamara et al.
2012/0202386 A1 8/2012 McNamara et al.
2012/0214344 A1 8/2012 Cohen et al.
2012/0242363 A1 9/2012 Breinlinger et al.
2013/0012038 A1 1/2013 Kirk et al.
2013/0017733 A1 1/2013 Kirk et al.
2013/0065454 A1 3/2013 Milbrand, Jr.
2013/0077268 A1 3/2013 Brunker et al.
2013/0078870 A1 3/2013 Milbrand, Jr.
2013/0078871 A1 3/2013 Milbrand, Jr.
2013/0109232 A1 5/2013 Paniaqua
2013/0143442 A1 6/2013 Cohen et al.
2013/0157512 A1 6/2013 Regnier et al.
2013/0183869 A1 7/2013 Minich et al.
2013/0189858 A1 7/2013 Johnescu et al.
2013/0196553 A1 8/2013 Gailus
2013/0210246 A1 8/2013 Davis et al.
2013/0217263 A1 8/2013 Pan
2013/0225006 A1 8/2013 Khilchenko et al.
2013/0288521 A1 10/2013 McClellan et al.
2013/0288525 A1 10/2013 McClellan et al.
2013/0288539 A1* 10/2013 McClellan ............... H01R 9/22 439/686
2013/0316590 A1 11/2013 Hon
2014/0004724 A1 1/2014 Cartier, Jr. et al.
2014/0004726 A1 1/2014 Cartier, Jr. et al.
2014/0004746 A1 1/2014 Cartier, Jr. et al.
2014/0057492 A1 2/2014 Lange et al.
2014/0057493 A1 2/2014 De Geest et al.
2014/0057494 A1 2/2014 Cohen
2014/0057498 A1 2/2014 Cohen
2014/0065883 A1 3/2014 Cohen et al.
2014/0098508 A1 4/2014 Dunham
2014/0148059 A1 5/2014 Long
2014/0209370 A1 7/2014 Minich
2014/0248796 A1 9/2014 Pan
2014/0273557 A1 9/2014 Cartier, Jr. et al.
2014/0273627 A1 9/2014 Cartier, Jr. et al.
2014/0287627 A1 9/2014 Cohen
2014/0308852 A1 10/2014 Gulla
2015/0056856 A1 2/2015 Atkinson et al.
2015/0111427 A1 4/2015 Wu et al.
2015/0236451 A1 8/2015 Cartier, Jr. et al.
2015/0236452 A1 8/2015 Cartier, Jr. et al.
2015/0255926 A1 9/2015 Paniagua
2015/0280351 A1 10/2015 Bertsch
2016/0141807 A1 5/2016 Gailus et al.
2016/0149343 A1 5/2016 Atkinson et al.
2016/0150633 A1 5/2016 Cartier, Jr.
2016/0150639 A1 5/2016 Gailus et al.
2016/0150645 A1 5/2016 Gailus et al.
2016/0181732 A1 6/2016 Laurx et al.
2016/0315420 A1 10/2016 Horning et al.
2016/0344141 A1 11/2016 Cartier, Jr. et al.
2017/0025783 A1 1/2017 Astbury et al.
2017/0047692 A1 2/2017 Cartier, Jr. et al.
2018/0062323 A1 3/2018 Kirk et al.
2018/0109043 A1 4/2018 Provencher et al.
2018/0145438 A1 5/2018 Cohen
2018/0219331 A1 8/2018 Cartier, Jr. et al.
2018/0233858 A1 8/2018 Cartier, Jr. et al.
2018/0324941 A1 11/2018 Gailus et al.
2019/0044284 A1 2/2019 Dunham
2019/0044285 A1 2/2019 Dunham
2019/0109405 A1 4/2019 Astbury et al.
2019/0334292 A1 10/2019 Cartier, Jr. et al.
2020/0021052 A1 1/2020 Milbrand, Jr. et al.
2020/0022252 A1 1/2020 Gailus et al.
2020/0235529 A1 7/2020 Kirk et al.
2020/0259297 A1 8/2020 Cartier, Jr. et al.
2020/0266585 A1 8/2020 Paniagua et al.
2020/0373689 A1 11/2020 Cartier et al.
2021/0076486 A1 3/2021 Gailus et al.
2021/0119371 A1 4/2021 Astbury et al.
2022/0173534 A1 6/2022 Cartier, Jr. et al.
2023/0113153 A1 4/2023 Gailus et al.
2023/0327363 A1 10/2023 Astbury et al.

FOREIGN PATENT DOCUMENTS

CN 101312275 A 11/2008
CN 100470934 C 3/2009
CN 101395760 A 3/2009
CN 101496217 A 7/2009
CN 101600293 A 12/2009
CN 101752700 A 6/2010
CN 101790818 A 7/2010
CN 101859946 A 10/2010
CN 101120490 B 11/2010
CN 101916931 A 12/2010
CN 201709040 U 1/2011
CN 201846527 U 5/2011
CN 102106041 A 6/2011
CN 102157857 A 8/2011

(56) References Cited

FOREIGN PATENT DOCUMENTS

| | | | |
|---|---|---|---|
| CN | 102232259 | A | 11/2011 |
| CN | 102239605 | A | 11/2011 |
| CN | 102265708 | A | 11/2011 |
| CN | 102292881 | A | 12/2011 |
| CN | 202111241 | U | 1/2012 |
| CN | 102356517 | A | 2/2012 |
| CN | 102405564 | A | 4/2012 |
| CN | 101600293 | B | 5/2012 |
| CN | 102448249 | A | 5/2012 |
| CN | 102570105 | A | 7/2012 |
| CN | 102598430 | A | 7/2012 |
| CN | 102760986 | A | 10/2012 |
| CN | 102859805 | A | 1/2013 |
| CN | 202695788 | U | 1/2013 |
| CN | 102986091 | A | 3/2013 |
| CN | 103151650 | A | 6/2013 |
| CN | 103296510 | A | 9/2013 |
| CN | 103491727 | A | 1/2014 |
| CN | 103857197 | A | 6/2014 |
| CN | 104022402 | A | 9/2014 |
| CN | 104040787 | A | 9/2014 |
| CN | 102138256 | B | 12/2014 |
| CN | 204130744 | U | 1/2015 |
| CN | 102176552 | B | 2/2015 |
| CN | 104425949 | A | 3/2015 |
| CN | 104577398 | A | 4/2015 |
| CN | 104577577 | A | 4/2015 |
| CN | 105655785 | A | 6/2016 |
| CN | 106099546 | A | 11/2016 |
| CN | 106463859 | A | 2/2017 |
| CN | 107112696 | A | 8/2017 |
| EP | 2 169 770 | A2 | 3/2010 |
| EP | 2209170 | A2 | 7/2010 |
| EP | 2259385 | A1 | 12/2010 |
| EP | 2405537 | A1 | 1/2012 |
| JP | 2009-037972 | A | 2/2009 |
| JP | 2014-107494 | A | 6/2014 |
| TW | M357771 | U | 5/2009 |
| TW | M380633 | U | 5/2010 |
| TW | 201205962 | A | 2/2012 |
| TW | 201315052 | A | 4/2013 |
| TW | 201334314 | A | 8/2013 |
| TW | 201334317 | A | 8/2013 |
| TW | I569516 | B | 2/2017 |
| WO | WO 2008/045269 | A3 | 5/2008 |
| WO | WO 2008/124057 | A2 | 10/2008 |
| WO | WO 2009/023238 | A1 | 2/2009 |
| WO | WO 2010/030622 | A1 | 3/2010 |
| WO | WO 2010/039188 | A1 | 4/2010 |
| WO | WO 2010/111379 | A2 | 9/2010 |
| WO | WO 2013/155147 | A1 | 10/2013 |
| WO | WO 2014/105435 | A1 | 7/2014 |

OTHER PUBLICATIONS

[No Author Listed], ExaMAX™ Connector System, press-fit products. FCI Application Specification No. GS-20-0361. Preliminary. Revision 6. Mar. 12, 2014. 25 pages.

[No Author Listed], SFF-8643 Specification for Mini Multilane 12 Gbs 8/4x Unshielded Connector, Rev 2.3. SFF Committee, Jan. 11, 2011, 24 pages.

[No Author Listed], Strada Whisper Connector Daughtercard Footprint. Tyco Electronics, Mar. 24, 2010, 1 page.

[No Author Listed], Strada Whisper High Speed Backplane Connector System. Tyco Electronics. Presentation. Mar. 24, 2010. 15 pages.

[No Author Listed], Zipline Connector System, http://www.slideshare.net/element14/zipline-connector-system Mar. 10, 2011. Last accessed Oct. 12, 2015. 15 pages.

Cartier et al., High Density, High Speed Electrical Connector, U.S. Appl. No. 18/339,708, filed Jun. 22, 2023.

* cited by examiner

VERY HIGH SPEED, HIGH DENSITY ELECTRICAL INTERCONNECTION SYSTEM WITH BROADSIDE SUBASSEMBLIES

RELATED APPLICATIONS

The present application is a continuation of U.S. patent application Ser. No. 16/858,182, entitled "VERY HIGH SPEED, HIGH DENSITY ELECTRICAL INTERCONNECTION SYSTEM WITH BROADSIDE SUBASSEMBLIES," filed on Apr. 24, 2020, which is a continuation of U.S. patent application Ser. No. 15/882,720, entitled "VERY HIGH SPEED, HIGH DENSITY ELECTRICAL INTERCONNECTION SYSTEM WITH EDGE TO BROADSIDE TRANSITION," filed on Jan. 29, 2018, which is a continuation of U.S. patent application Ser. No. 15/113,371, entitled "VERY HIGH SPEED, HIGH DENSITY ELECTRICAL INTERCONNECTION SYSTEM WITH EDGE TO BROADSIDE TRANSITION" filed on Jul. 21, 2016, which is a U.S. national stage filing under 35 U.S.C. § 371 based on International Application No. PCT/US2015/012542, entitled "VERY HIGH SPEED, HIGH DENSITY ELECTRICAL INTERCONNECTION SYSTEM WITH EDGE TO BROADSIDE TRANSITION," filed on Jan. 22, 2015, which claims priority under 35 U.S.C. § 119(e) to U.S. Provisional Application Ser. No. 62/078,945, entitled "VERY HIGH SPEED, HIGH DENSITY ELECTRICAL INTERCONNECTION SYSTEM WITH IMPEDE DANCE CONTROL IN MATING REGION," filed on Nov. 12, 2014. International Application No. PCT/US2015/012542 also claims priority under 35 U.S.C. § 119(e) to U.S. Provisional Application Ser. No. 61/930,411 entitled "HIGH SPEED, HIGH DENSITY ELECTRICAL CONNECTOR WITH SHIELDED SIGNAL PATHS," filed on Jan. 22, 2014. The entire contents of these applications are incorporated herein by reference in their entirety for all purposes.

BACKGROUND

This patent application relates generally to interconnection systems, such as those including electrical connectors, used to interconnect electronic assemblies.

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards is to have one printed circuit board serve as a backplane. Other printed circuit boards, called "daughterboards" or "daughtercards," may be connected through the backplane.

A known backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

Connectors may also be used in other configurations for interconnecting printed circuit boards and for interconnecting other types of devices, such as cables, to printed circuit boards. Sometimes, one or more smaller printed circuit boards may be connected to another larger printed circuit board. In such a configuration, the larger printed circuit board may be called a "mother board" and the printed circuit boards connected to it may be called daughterboards. Also, boards of the same size or similar sizes may sometimes be aligned in parallel. Connectors used in these applications are often called "stacking connectors" or "mezzanine connectors."

Regardless of the exact application, electrical connector designs have been adapted to minor trends in the electronics industry. Electronic systems generally have gotten smaller, faster, and functionally more complex. Because of these changes, the number of circuits in a given area of an electronic system, along with the frequencies at which the circuits operate, have increased significantly in recent years. Current systems pass more data between printed circuit boards and require electrical connectors that are electrically capable of handling more data at higher speeds than connectors of even a few years ago.

In a high density, high speed connector, electrical conductors may be so close to each other that there may be electrical interference between adjacent signal conductors. To reduce interference, and to otherwise provide desirable electrical properties, shield members are often placed between or around adjacent signal conductors. The shields may prevent signals carried on one conductor from creating "crosstalk" on another conductor. The shield may also impact the impedance of each conductor, which may further contribute to desirable electrical properties.

Examples of shielding can be found in U.S. Pat. Nos. 4,632,476 and 4,806,107, which show connector designs in which shields are used between columns of signal contacts. These patents describe connectors in which the shields run parallel to the signal contacts through both the daughterboard connector and the backplane connector. Cantilevered beams are used to make electrical contact between the shield and the backplane connectors. U.S. Pat. Nos. 5,433,617, 5,429,521, 5,429,520, and 5,433,618 show a similar arrangement, although the electrical connection between the backplane and shield is made with a spring type contact. Shields with torsional beam contacts are used in the connectors described in U.S. Pat. No. 6,299,438. Further shields are shown in U.S. Pre-grant Publication 2013-0109232.

Other connectors have shield plates within only the daughterboard connector. Examples of such connector designs can be found in U.S. Pat. Nos. 4,846,727, 4,975,084, 5,496,183, and 5,066,236. Another connector with shields only within the daughterboard connector is shown in U.S. Pat. No. 5,484,310. U.S. Pat. No. 7,985,097 is a further example of a shielded connector.

Other techniques may be used to control the performance of a connector. For instance, transmitting signals differentially may also reduce crosstalk. Differential signals are carried on a pair of conducting paths, called a "differential pair." The voltage difference between the conductive paths represents the signal. In general, a differential pair is designed with preferential coupling between the conducting paths of the pair. For example, the two conducting paths of a differential pair may be arranged to run closer to each other than to adjacent signal paths in the connector. No shielding is desired between the conducting paths of the pair, but shielding may be used between differential pairs. Electrical connectors can be designed for differential signals as well as for single-ended signals. Examples of differential electrical connectors are shown in U.S. Pat. Nos. 6,293,827, 6,503,103, 6,776,659, 7,163,421, and 7,794,278.

Another modification made to connectors to accommodate changing requirements is that connectors have become much larger in some applications. Increasing the size of a connector may lead to manufacturing tolerances that are much tighter. For instance, the permissible mismatch between the conductors in one half of a connector and the receptacles in the other half may be constant, regardless of the size of the connector. However, this constant mismatch, or tolerance, may become a decreasing percentage of the connector's overall length as the connector gets longer. Therefore, manufacturing tolerances may be tighter for larger connectors, which may increase manufacturing costs. One way to avoid this problem is to use connectors that are constructed from modules to extend the length of the connector. Teradyne Connection Systems of Nashua, N.H., USA pioneered a modular connector system called HD+®. This system has multiple modules, each having multiple columns of signal contacts, such as 15 or 20 columns. The modules are held together on a metal stiffener to enable construction of a connector of any desired length.

Another modular connector system is shown in U.S. Pat. Nos. 5,066,236 and 5,496,183. Those patents describe "module terminals" each having a single column of signal contacts. The module terminals are held in place in a plastic housing module. The plastic housing modules are held together with a one-piece metal shield member. Shields may be placed between the module terminals as well.

BRIEF SUMMARY

Embodiments of a high speed, high density interconnection system are described. Very high speed performance may be achieved by broadside coupled differential pairs within connector subassemblies.

In one aspect, an electrical connector may comprise a plurality of subassemblies arranged side-by-side. Each subassembly of the plurality may comprise a plurality of pairs of signal conductors, each pair comprising a first signal conductor and a second signal conductor. Each of the first signal conductor and the second signal conductor may comprise a first end portion and a second end portion, a contact tail formed at the first end portion, a mating contact portion formed at the second end portion, and an intermediate portion joining the first end portion and the second end portion. At least the intermediate portions may comprise broadsides and edges. Each subassembly may further comprise an insulative portion comprising a first side and a second side separated from the first side in a first direction. The first side may comprise a plurality of first grooves. The second side may comprise a plurality of second grooves. An intermediate portion of a first signal conductor of each pair of the plurality of pairs of signal conductors may be inserted into a first groove. An intermediate portion of a second signal conductor of each pair of the plurality of pairs of signal conductors may be inserted into a second groove. The plurality of first grooves may be aligned in the first direction with respective second grooves such that at least the intermediate portions of the plurality of pairs are broadside coupled.

In another aspect, a method of manufacturing an electrical connector may comprise forming a plurality of insulative portions, each insulative portion of the plurality of insulative portions comprising a first side and a second side separated from the first side in a first direction with a plurality of first grooves on the first side and a plurality of second grooves on the second side; and forming a plurality of signal conductors. Each signal conductor of the plurality may comprise a first end portion and a second end portion, a contact tail formed at the first end portion, a mating contact portion formed at the second end portion, and an intermediate portion joining the first end portion and the second end portion, wherein at least the intermediate portion comprises broadsides and edges.

The method may further comprise forming a plurality of subassemblies by, for each subassembly of the plurality of subassemblies; inserting an intermediate portion of a signal conductor of the plurality of signal conductors into each first groove of the plurality of first grooves of a respective insulative portion; inserting an intermediate portion of a signal conductor of the plurality of signal conductors into each second groove of the plurality of second grooves of the respective insulative portion, wherein the plurality of first grooves are aligned in the first with respective second grooves of the plurality of second grooves direction such that at least the intermediate portions of the signal conductors inserted into respective first and second grooves form broadside coupled pairs; and arranging the plurality of subassemblies side-by-side.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
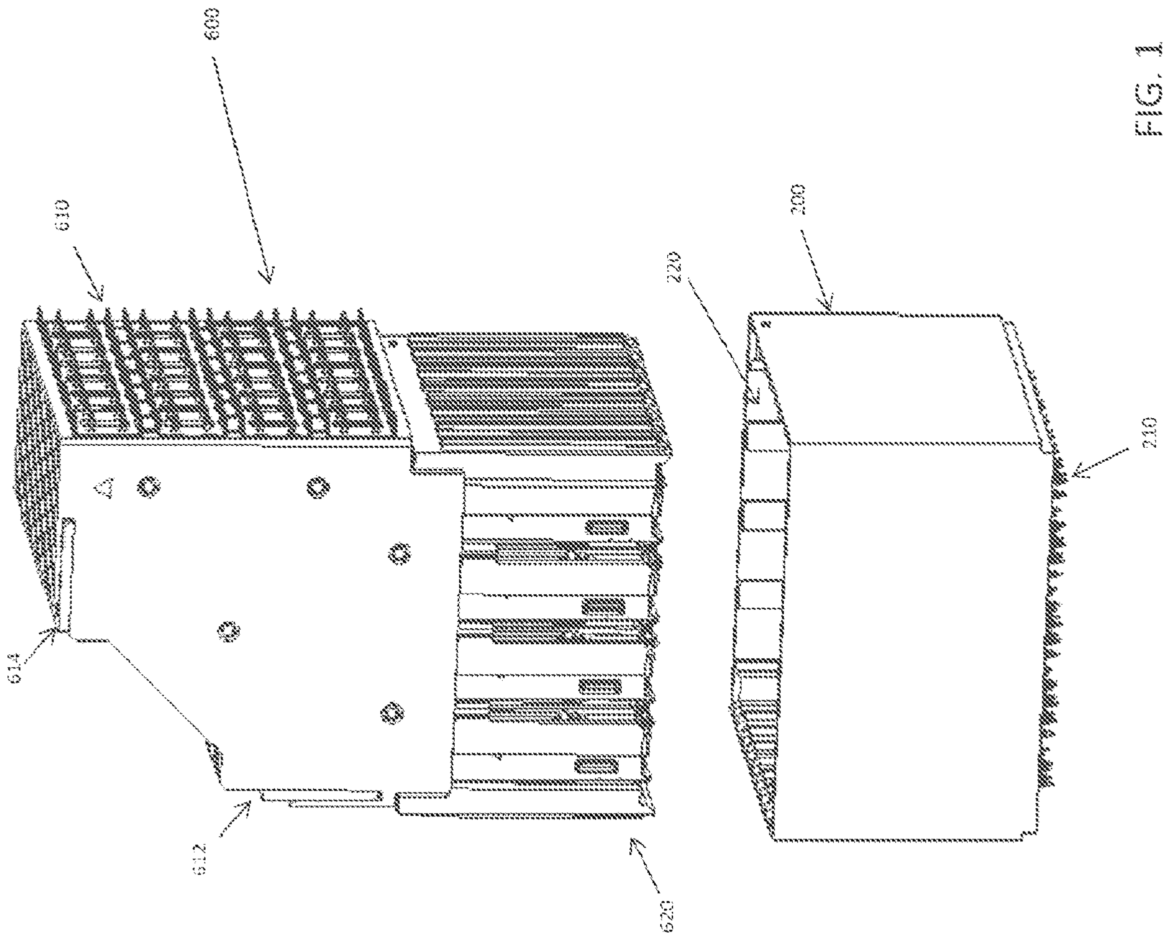
FIG. 1 is an isometric view of an illustrative electrical interconnection system, in accordance with some embodiments.

The inventors have recognized and appreciated that performance of a high density interconnection system may be increased, particularly those that carry very high frequency signals that are necessary to support high data rates, with connector designs that provide balanced signal paths at high frequencies. The connector may be configured to provide advantageous manufacturing techniques while employing techniques that provide desirable signal integrity, such as controlled spacing between signal conductors and reference conductors.

The inventors have recognized and appreciated that a broadside-coupled configuration may provide low skew in a right angle connector. When the connector operates at a relatively low frequency, the skew in a pair of edge-coupled right angle conductive elements may be a relatively small portion of the wavelength and therefore may not significantly impact the differential signal. However, when the connector operates at a higher frequency (e.g., 25 GHz, 30 GHz, 35 GHz, 40 GHz, 45 GHz, etc.), such skew may become a relatively large portion of the wavelength and may negatively impact the differential signal. Therefore, in some embodiments, a broadside-coupled configuration may be adopted to reduce skew. The broadside-coupled configuration may be used for at least the intermediate portions of signal conductors that are not straight, such as the intermediate portions that follow a path making a 90 degree angle in a right angle connector.

The inventors have further recognized and appreciated that, while a broadside-coupled configuration may be desirable for the intermediate portions of the conductive elements, a completely or predominantly edge-coupled configuration may be desirable at a mating interface with another connector or at an attachment interface with a printed circuit board. Such a configuration, for example, may facilitate routing within a printed circuit board of signal traces that connect to vias receiving contact tails from the connector.

Accordingly, the conductive elements may have transition regions at either or both ends. In a transition region, a conductive element may jog out of the plane parallel to the wide dimension of the conductive element. In some embodiments, each transition region may have a jog toward the transition region of the other conductive element. In some embodiments, the conductive elements will each jog toward the plane of the other conductive element such that the ends of the transition regions align in a same plane that is parallel to, but between the planes of the individual conductive elements. To avoid contact of the transition regions, the conductive elements may also jog away from each other in the transition regions. As a result, the conductive elements in the transition regions may be aligned edge to edge in a plane that is parallel to, but offset from the planes of the individual conductive elements. Such a configuration may provide a balanced pair over a frequency range of interest, while providing routing channels within a printed circuit board that support a high density connector or while providing mating contacts on a pitch that facilitates manufacture of the mating contact portions.

The frequency range of interest may depend on the operating parameters of the system in which such a connector is used, but may generally have an upper limit between about 15 GHz and 50 GHz, such as 25 GHz, 30 or 40 GHz, although higher frequencies or lower frequencies may be of interest in some applications. Some connector designs may have frequency ranges of interest that span only a portion of this range, such as 1 to 10 GHz or 3 to 15 GHz or 5 to 35 GHz. The impact of unbalanced signal pairs may be more significant at these higher frequencies.

The operating frequency range for an interconnection system may be determined based on the range of frequencies that can pass through the interconnection with acceptable signal integrity. Signal integrity may be measured in terms of a number of criteria that depend on the application for which an interconnection system is designed. Some of these criteria may relate to the propagation of the signal along a single-ended signal path, a differential signal path, a hollow waveguide, or any other type of signal path. Two examples of such criteria are the attenuation of a signal along a signal path or the reflection of a signal from a signal path.

Other criteria may relate to interaction of multiple distinct signal paths. Such criteria may include, for example, near end cross talk, defined as the portion of a signal injected on one signal path at one end of the interconnection system that is measurable at any other signal path on the same end of the interconnection system. Another such criterion may be far end cross talk, defined as the portion of a signal injected on one signal path at one end of the interconnection system that is measurable at any other signal path on the other end of the interconnection system.

As specific examples, it could be required that signal path attenuation be no more than 3 dB power loss, reflected power ratio be no greater than −20 dB, and individual signal path to signal path crosstalk contributions be no greater than −50 dB. Because these characteristics are frequency dependent, the operating range of an interconnection system is defined as the range of frequencies over which the specified criteria are met.

Designs of an electrical connector are described herein that improve signal integrity for high frequency signals, such as at frequencies in the GHz range, including up to about 25 GHz or up to about 40 GHz or higher, while maintaining high density, such as with a spacing between adjacent mating contacts on the order of 3 mm or less, including center-to-center spacing between adjacent contacts in a column of between 1 mm and 2.5 mm or between 2 mm and 2.5 mm, for example. Spacing between columns of mating contact portions may be similar, although there is no requirement that the spacing between all mating contacts in a connector be the same.

FIG. 1 illustrates an electrical interconnection system of the form that may be used in an electronic system. In this example, the electrical interconnection system includes a right angle connector and may be used, for example, in electrically connecting a daughtercard to a backplane. These figures illustrate two mating connectors. In this example, connector 200 is designed to be attached to a backplane and connector 600 is designed to attach to a daughtercard. As can be seen in FIG. 1, daughtercard connector 600 includes contact tails 610 designed to attach to a daughtercard (not shown). Backplane connector 200 includes contact tails 210, designed to attach to a backplane (not shown). These contact tails form one end of conductive elements that pass through the interconnection system. When the connectors are mounted to printed circuit boards, these contact tails will make electrical connection to conductive structures within the printed circuit board that carry signals or are connected to a reference potential. In the example illustrated the contact tails are press fit, "eye of the needle," contacts that are designed to be pressed into vias in a printed circuit board. However, other forms of contact tails may be used.

Each of the connectors also has a mating interface where that connector can mate—or be separated from—the other connector. Daughtercard connector 600 includes a mating interface 620. Backplane connector 200 includes a mating interface 220. Though not fully visible in the view shown in FIG. 1, mating contact portions of the conductive elements are exposed at the mating interface.

Each of these conductive elements includes an intermediate portion that connects a contact tail to a mating contact portion. The intermediate portions may be held within a connector housing, at least a portion of which may be dielectric so as to provide electrical isolation between conductive elements. Additionally, the connector housings may include conductive or lossy portions, which in some embodiments may provide conductive or partially conductive paths between some of the conductive elements. In some embodiments, the conductive portions may provide shielding. The lossy portions may also provide shielding in some instances and/or may provide desirable electrical properties within the connectors.

In various embodiments, dielectric members may be molded or over-molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

All of the above-described materials are suitable for use as binder material in manufacturing connectors. In accordance some embodiments, one or more fillers may be included in some or all of the binder material. As a non-limiting example, thermoplastic PPS filled to 30% by volume with glass fiber may be used to form the entire connector housing or dielectric portions of the housings.

Alternatively or additionally, portions of the housings may be formed of conductive materials, such as machined metal or pressed metal powder. In some embodiments, portions of the housing may be formed of metal or other conductive material with dielectric members spacing signal conductors from the conductive portions. In the embodiment illustrated, for example, a housing of backplane connector 200 may have regions formed of a conductive material with insulative members separating the intermediate portions of signal conductors from the conductive portions of the housing.

The housing of daughtercard connector 600 may also be formed in any suitable way. In the embodiment illustrated, daughtercard connector 600 may be formed from multiple subassemblies, referred to herein as "wafers." Each of the wafers (700, FIG. 7) may include a housing portion, which may similarly include dielectric, lossy and/or conductive portions. One or more members may hold the wafers in a desired position. For example, support members 612 and 614 may hold top and rear portions, respectively, of multiple wafers in a side-by-side configuration. Support members 612 and 614 may be formed of any suitable material, such as a sheet of metal stamped with tabs, openings or other features that engage corresponding features on the individual wafers.

Other members that may form a portion of the connector housing may provide mechanical integrity for daughtercard connector 600 and/or hold the wafers in a desired position. For example, a front housing portion 640 (FIG. 6) may receive portions of the wafers forming the mating interface. Any or all of these portions of the connector housing may be dielectric, lossy and/or conductive, to achieve desired electrical properties for the interconnection system.

In some embodiments, each wafer may hold a column of conductive elements forming signal conductors. These signal conductors may be shaped and spaced to form single ended signal conductors. However, in the embodiment illustrated in FIG. 1, the signal conductors are shaped and spaced in pairs to provide differential signal conductors. Each of the columns may include or be bounded by conductive elements serving as ground conductors. It should be appreciated that ground conductors need not be connected to earth ground, but are shaped to carry reference potentials, which may include earth ground, DC voltages or other suitable reference potentials. The "ground" or "reference" conductors may have a shape different than the signal conductors, which are configured to provide suitable signal transmission properties for high frequency signals.

Conductive elements may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

The spacing between adjacent columns of conductors may be within a range that provides a desirable density and desirable signal integrity. As a non-limiting example, the conductors may be stamped from 0.4 mm thick copper alloy, and the conductors within each column may be spaced apart by 2.25 mm and the columns of conductors may be spaced apart by 2.4 mm. However, a higher density may be achieved by placing the conductors closer together. In other embodiments, for example, smaller dimensions may be used to provide higher density, such as a thickness between 0.2 and 0.4 mm or spacing of 0.7 to 1.85 mm between columns or between conductors within a column. Moreover, each column may include four pairs of signal conductors, such that it density of 60 or more pairs per linear inch is achieved for the interconnection system illustrated in FIG. 1. However, it should be appreciated that more pairs per column, tighter spacing between pairs within the column and/or smaller distances between columns may be used to achieve a higher density connector.

The wafers may be formed any suitable way. In some embodiments, the wafers may be formed by stamping columns of conductive elements from a sheet of metal and over molding dielectric portions on the intermediate portions of the conductive elements. In other embodiments, wafers may be assembled from modules each of which includes a single, single-ended signal conductor, a single pair of differential signal conductors or any suitable number of single ended or differential pairs.

The inventors have recognized and appreciated that assembling wafers from modules may aid in reducing "skew" in signal pairs at higher frequencies, such as between about 25 GHz and 40 GHz, or higher. Skew, in this context, refers to the difference in electrical propagation time between signals of a pair that operates as a differential signal. Modular construction that reduces skew is designed described, for example in co-pending application 61/930, 411, which is incorporated herein by reference.

In accordance with techniques described in that co-pending application, in some embodiments, connectors may be formed of modules, each carrying a signal pair. The modules may be individually shielded, such as by attaching shield members to the modules and/or inserting the modules into an organizer or other structure that may provide electrical shielding between pairs and/or ground structures around the conductive elements carrying signals.

In some embodiments, signal conductor pairs within each module may be broadside coupled over substantial portions of their lengths. Broadside coupling enables the signal conductors in a pair to have the same physical length. To facilitate routing of signal traces within the connector footprint of a printed circuit board to which a connector is attached and/or constructing of mating interfaces of the connectors, the signal conductors may be aligned with edge to edge coupling in one or both of these regions. As a result, the signal conductors may include transition regions in which coupling changes from edge-to-edge to broadside or vice versa. As described below, these transition regions may be designed to prevent mode conversion or suppress undesired propagation modes that can interfere with signal integrity of the interconnection system.

The modules may be assembled into wafers or other connector structures. In some embodiments, a different module may be formed for each row position at which a pair is to be assembled into a right angle connector. These modules may be made to be used together to build up a connector with as many rows as desired. For example, a module of one shape may be formed for a pair to be positioned at the shortest rows of the connector, sometimes called the a-b rows. A separate module may be formed for conductive elements in the next longest rows, sometimes called the c-d rows. The inner portion of the module with the c-d rows may be designed to conform to the outer portion of the module with the a-b rows.

Figure 8:
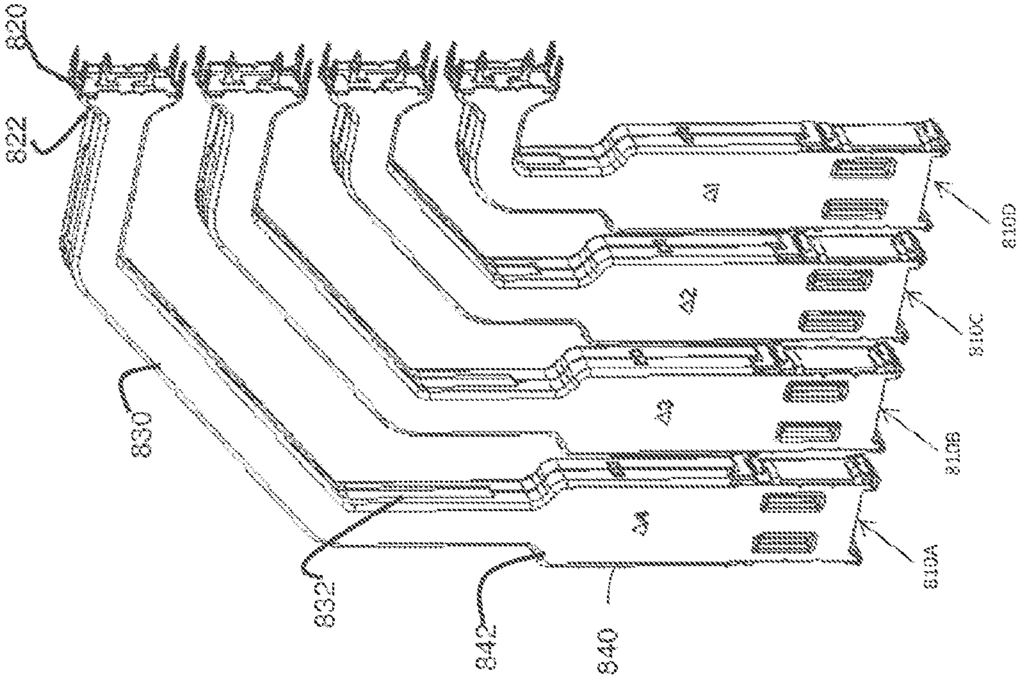
FIG. 8 is an isometric view of wafer modules of the wafer assembly of FIG. 7.

This pattern may be repeated for any number of pairs. Each module may be shaped to be used with modules that carry pairs for shorter and/or longer rows. To make a connector of any suitable size, a connector manufacturer may assemble into a wafer a number of modules to provide a desired number of pairs in the wafer. In this way, a connector manufacturer may introduce a connector family for a widely used connector size—such as 2 pairs. As customer requirements change, the connector manufacturer may procure tools for each additional pair, or, for modules that contain multiple pairs, group of pairs to produce connectors of larger sizes. The tooling used to produce modules for smaller connectors can be used to produce modules for the shorter rows even of the larger connectors. Such a modular connector is illustrated in FIG. 8.

Figure 2:
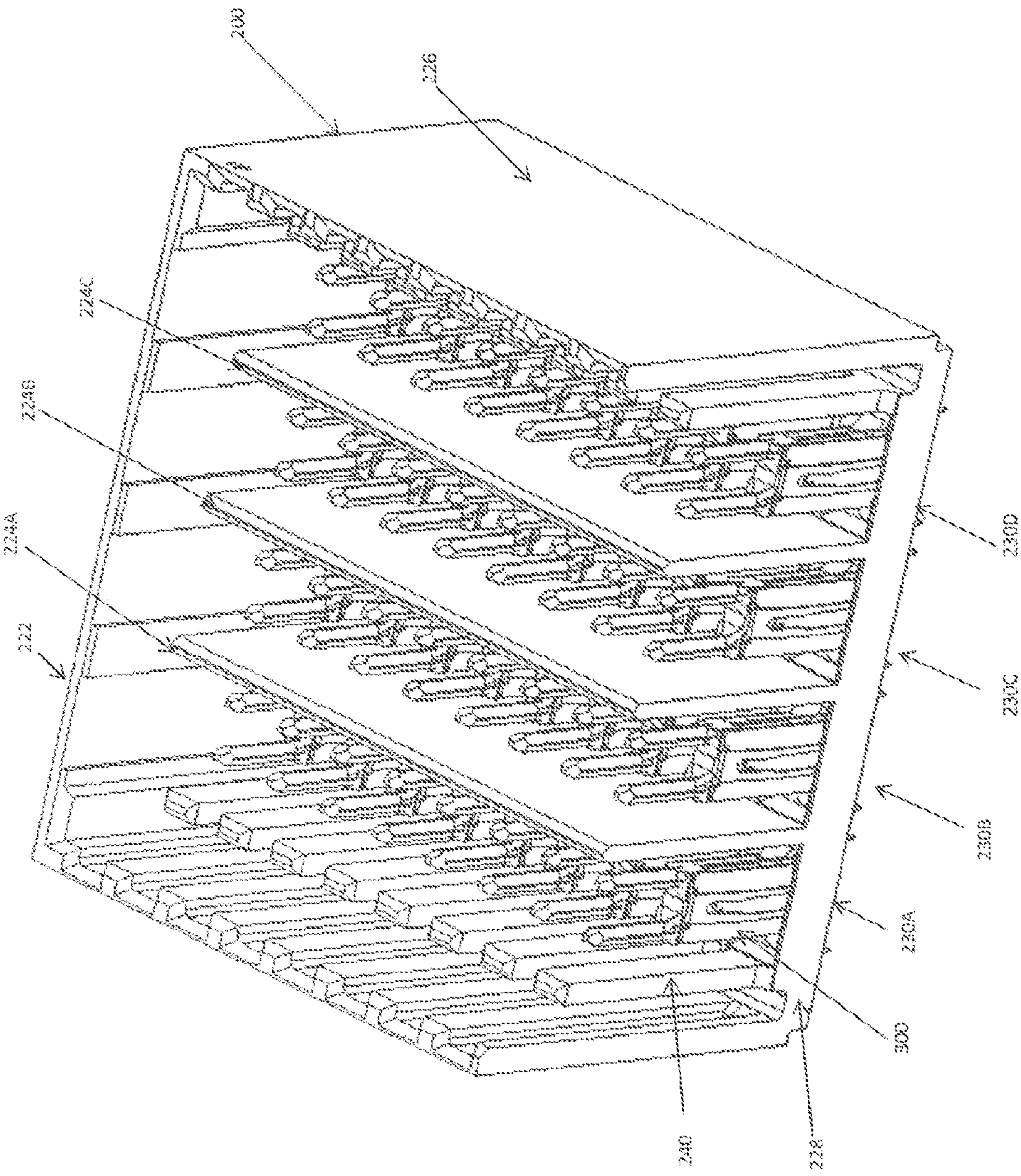
FIG. 2 is an isometric view, partially cutaway, of the backplane connector of FIG. 1.

Further details of the construction of the interconnection system of FIG. 1 are provided in FIG. 2, which shows backplane connector 200 partially cutaway. In the embodiment illustrated in FIG. 2, a forward wall of housing 222 is cut away to reveal the interior portions of mating interface 220.

In the embodiment illustrated, backplane connector 200 also has a modular construction. Multiple pin modules 300 are organized to form an array of conductive elements. Each of the pin modules 300 may be designed to mate with a module of daughtercard connector 600.

In the embodiment illustrated, four rows and eight columns of pin modules 300 are shown. With each pin module having two signal conductors, the four rows 230A, 230B, 230C and 230D of pin modules create columns with four pairs or eight signal conductors, in total. It should be appreciated, however, that the number of signal conductors per row or column is not a limitation of the invention. A greater or lesser number of rows of pin modules may be include within housing 222. Likewise, a greater or lesser number of columns may be included within housing 222. Alternatively or additionally, housing 222 may be regarded as a module of a backplane connector, and multiple such modules may be aligned side to side to extend the length of a backplane connector.

In the embodiment illustrated in FIG. 2, each of the pin modules 300 contains conductive elements serving as signal conductors. Those signal conductors are held within insulative members, which may serve as a portion of the housing of backplane connector 200. The insulative portions of the pin modules 300 may be positioned to separate the signal conductors from other portions of housing 222. In this configuration, other portions of housing 222 may be conductive or partially conductive, such as may result from the use of lossy materials.

In some embodiments, housing 222 may contain both conductive and lossy portions. For example, a shroud including walls 226 and a floor 228 may be pressed from a powdered metal or formed from conductive material in any other suitable way. Pin modules 300 may be inserted into openings within floor 228.

Lossy or conductive members may be positioned adjacent rows 230A, 230B, 230C and 230D of pin modules 300. In the embodiment of FIG. 2, separators 224A, 224B and 224C are shown between adjacent rows of pin modules. Separators 224A, 224B and 224C may be conductive or lossy, and may be formed as part of the same operation or from the same member that forms walls 226 and floor 228. Alternatively, separators 224A, 224B and 224C may be inserted separately into housing 222 after walls 226 and floor 228 are formed. In embodiments in which separators 224A, 224B and 224C formed separately from walls 226 and floor 228 and subsequently inserted into housing 222, separators 224A, 224B and 224C may be formed of a different material than walls 226 and/or floor 228. For example, in some embodiments, walls 226 and floor 228 may be conductive while separators 224A, 224B and 224C may be lossy or partially lossy and partially conductive.

In some embodiments, other lossy or conductive members may extend into mating interface 220, perpendicular to floor 228. Members 240 are shown adjacent to end-most rows 230A and 230D. In contrast to separators 224A, 224B and 224C, which extend across the mating interface 220, separator members 240, approximately the same width as one column, are positioned in rows adjacent row 230A and row 230D. Daughtercard connector 600 may include, in its mating interface 620, slots to receive, separators 224A, 224B and 224C. Daughtercard connector 600 may include openings that similarly receive members 240. Members 240 may have a similar electrical effect to separators 224A, 224B and 224C, in that both may suppress resonances, crosstalk or other undesired electrical effects. Members 240, because they fit into smaller openings within daughtercard connector 600 than separators 224A, 224B and 224C, may enable greater mechanical integrity of housing portions of daughtercard connector 600 at the sides where members 240 are received.

Figure 3:
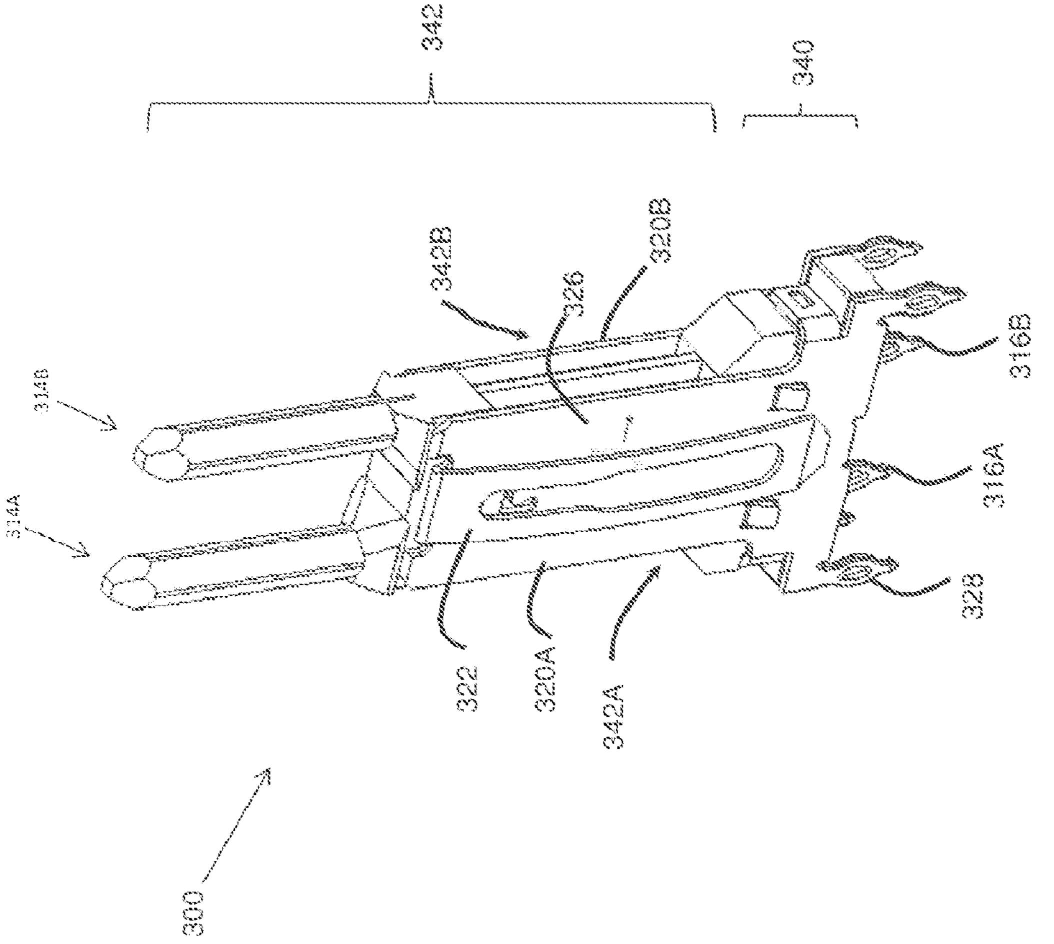
FIG. 3 is an isometric view of a pin assembly of the backplane connector of FIG. 2.

FIG. 3 illustrates a pin module 300 in greater detail. In this embodiment, each pin module includes a pair of conductive elements acting as signal conductors 314A and 314B. Each of the signal conductors has a mating interface portion shaped as a pin. Opposing ends of the signal conductors have contact tails 316A and 316B. In this embodiment, the contact tails are shaped as press fit compliant sections. Intermediate portions of the signal conductors, connecting the contact tails to the mating contact portions, pass through pin module 300.

Conductive elements serving as reference conductors 320A and 320B are attached at opposing exterior surfaces of pin module 300. Each of the reference conductors has contact tails 328, shaped for making electrical connections to vias within a printed circuit board. The reference conductors also have mating contact portions. In the embodiment illustrated, two types of mating contact portions are illustrated. Compliant member 322 may serve as a mating contact portion, pressing against a reference conductor in daughtercard connector 600. In some embodiments, surfaces 324 and 326 alternatively or additionally may serve as mating contact portions, where reference conductors from the mating conductor may press against reference conductors 320A or 320B. However, in the embodiment illustrated, the reference conductors may be shaped such that electrical contact is made only at compliant member 322.

Figure 4:
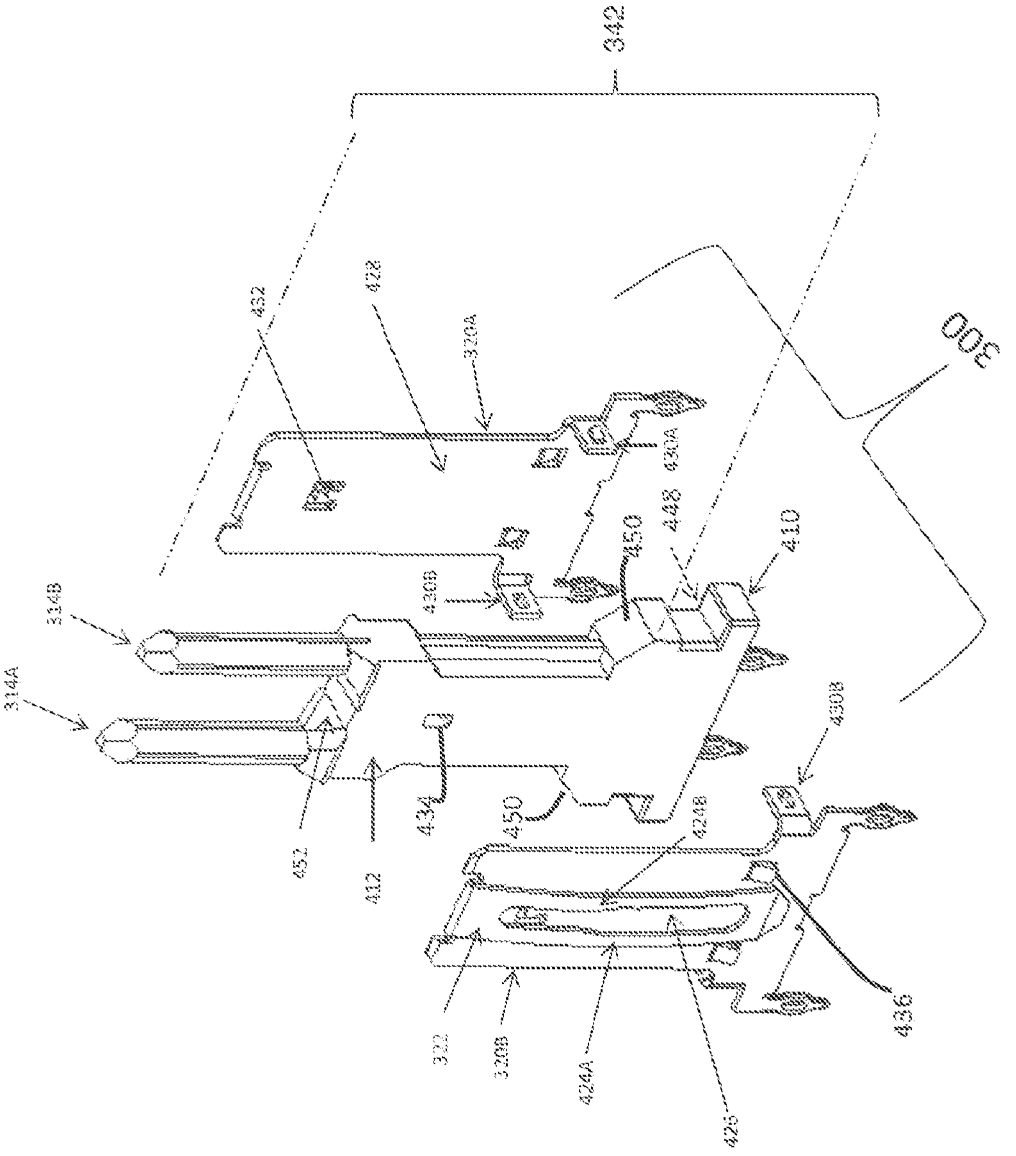
FIG. 4 is an exploded view of the pin assembly of FIG. 3.

FIG. 4 shows an exploded view of pin module 300. Intermediate portions of the signal conductors 314A and 314B are held within an insulative member 410, which may form a portion of the housing of backplane connector 200. Insulative member 410 may be insert molded around signal conductors 314A and 314B. A surface 412 against which reference conductor 320B presses is visible in the exploded view of FIG. 4 Likewise, the surface 428 of reference conductor 320A, which presses against a surface of the insulative member 410 not visible in FIG. 4, can also be seen in this view.

As can be seen, the surface 428 is substantially unbroken. Attachment features, such as tab 432 may be formed in the surface 428. Such a tab may engage an opening (not visible in the view shown in FIG. 4) in insulative member 410 to hold reference conductor 320A to insulative member 410. A similar tab (not numbered) may be formed in reference conductor 320B. As shown, these tabs, which serve as attachment mechanisms, are centered between signal conductors 314A and 314B where radiation from or affecting the pair is relatively low. Additionally, tabs, such as 436, may be formed in reference conductors 320A and 320B. Tabs 436 may engage insulative member 410 to hold pin module 300 in an opening in floor 228.

In the embodiment illustrated, compliant member 322 is not cut from the planar portion of the reference conductor 320B that presses against the surface 412 of the insulative member 410. Rather, compliant member 322 is formed from a different portion of a sheet of metal and folded over to be parallel with the planar portion of the reference conductor 320B. In this way, no opening is left in the planar portion of the reference conductor 320B from forming compliant member 322. Moreover, as shown, compliant member 322 has two compliant portions 424A and 424B, which are joined together at their distal ends but separated by an opening 426. This configuration may provide mating contact portions with a suitable mating force in desired locations without leaving an opening in the shielding around pin module 300. However, a similar effect may be achieved in some embodiments by attaching separate compliant members to reference conductors 320A and 320B.

The reference conductors 320A and 320B may be held to pin module 300 in any suitable way. As noted above, tabs 432 may engage an opening 434 in the insulative member 410. Additionally or alternatively, straps or other features may be used to hold other portions of the reference conductors. As shown each reference conductor includes straps 430A and 430B. Straps 430A include tabs while straps 430B include openings adapted to receive those tabs. Here reference conductors 320A and 320B have the same shape, and may be made with the same tooling, but are mounted on opposite surfaces of the pin module 300. As a result, a tab 430A of one reference conductor aligns with a tab 430B of the opposing reference conductor such that the tab 430A and the tab 430B interlock and hold the reference conductors in place. These tabs may engage in an opening 448 in the insulative member, which may further aid in holding the reference conductors in a desired orientation relative to signal conductors 314A and 314B in pin module 300.

FIG. 4 further reveals a tapered surface 450 of the insulative member 410. In this embodiment surface 450 is tapered with respect to the axis of the signal conductor pair formed by signal conductors 314A and 314B. Surface 450 is tapered in the sense that it is closer to the axis of the signal conductor pair closer to the distal ends of the mating contact portions and further from the axis further from the distal ends. In the embodiment illustrated, pin module 300 is symmetrical with respect to the axis of the signal conductor pair and a tapered surface 450 is formed adjacent each of the signal conductors 314A and 314B.

In accordance with some embodiments, some or all of the adjacent surfaces in mating connectors may be tapered. Accordingly, though not shown in FIG. 4, surfaces of the insulative portions of daughtercard connector 600 that are adjacent to tapered surfaces 450 may be tapered in a complementary fashion such that the surfaces from the mating connectors conform to one another when the connectors are in the designed mating positions.

Tapered surfaces in the mating interfaces may avoid abrupt changes in impedance as a function of connector separation. Accordingly, other surfaces designed to be adjacent a mating connector may be similarly tapered. FIG. 4 shows such tapered surfaces 452. As shown, tapered surfaces 452 are between signal conductors 314A and 314B. Surfaces 450 and 452 cooperate to provide a taper on the insulative portions on both sides of the signal conductors.

Figure 5:
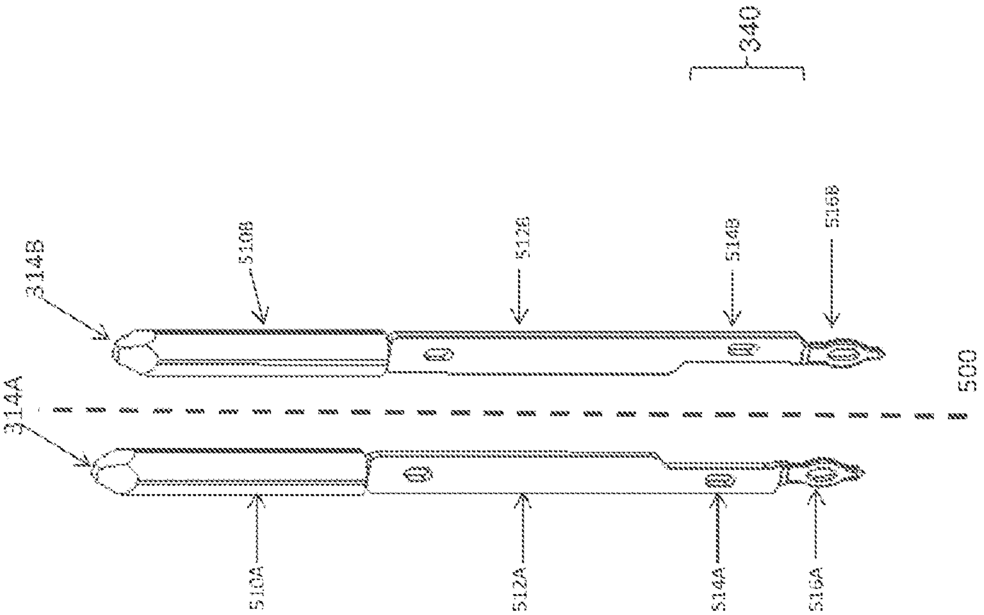
FIG. 5 is an isometric view of signal conductors of the pin assembly of FIG. 3.

FIG. 5 shows further detail of pin module 300. Here, the signal conductors are shown separated from the pin module. FIG. 5 illustrates the signal conductors before being over molded by insulative portions or otherwise being incorporated into a pin module 300. However, in some embodiments, the signal conductors may be held together by a carrier strip or other suitable support mechanism, not shown in FIG. 5, before being assembled into a module.

In the illustrated embodiment, the signal conductors 314A and 314B are symmetrical with respect to an axis 500 of the signal conductor pair. Each has a mating contact portion, 510A or 510B shaped as a pin. Each also has an intermediate portion 512A or 512B, and 514A or 514B. Here, different widths are provided to provide for matching impedance to a mating connector and a printed circuit board, despite different materials or construction techniques in each. A transition region may be included, as illustrated, to provide a gradual transition between regions of different width. Contact tails 516A or 516B may also be included.

In the embodiment illustrated, intermediate portions 512A, 512B, 514A and 514B may be flat, with broadsides and narrower edges. The signal conductors of the pairs are, in the embodiment illustrated, aligned edge-to-edge and are thus configured for edge coupling. In other embodiments, some or all of the signal conductor pairs may alternatively be broadside coupled.

Mating contact portions may be of any suitable shape, but in the embodiment illustrated, they are cylindrical. The cylindrical portions may be formed by rolling portions of a sheet of metal into a tube or in any other suitable way. Such a shape may be created, for example, by stamping a shape from a sheet of metal that includes the intermediate portions. A portion of that material may be rolled into a tube to provide the mating contact portion. Alternatively or additionally, a wire or other cylindrical element may be flattened to form the intermediate portions, leaving the mating contact portions cylindrical. One or more openings (not numbered) may be formed in the signal conductors. Such openings may ensure that the signal conductors are securely engaged with the insulative member 410.

Figure 6:
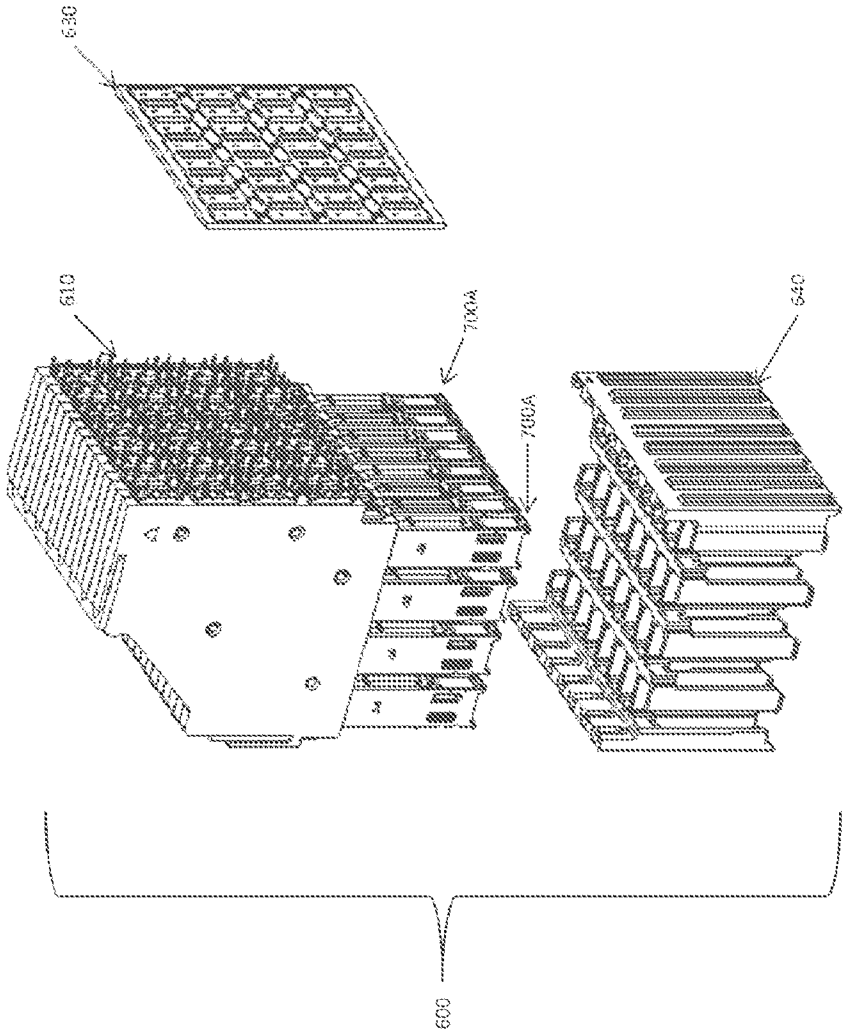
FIG. 6 is an isometric view, partially exploded, of the daughtercard connector of FIG. 1.

Turning to FIG. 6, further details of daughtercard connector 600 are shown in a partially exploded view. As shown, connector 600 includes multiple wafers 700A held together in a side-by-side configuration. Here, eight wafers, corresponding to the eight columns of pin modules in backplane connector 200, are shown. However, as with backplane connector 200, the size of the connector assembly may be configured by incorporating more rows per wafer, more wafers per connector or more connectors per interconnection system.

Conductive elements within the wafers 700A may include mating contact portions and contact tails. Contact tails 610 are shown extending from a surface of connector 600 adapted for mounting against a printed circuit board. In some embodiments, contact tails 610 may pass through a member 630. Member 630 may include insulative, lossy or conductive portions. In some embodiments, contact tails associated with signal conductors may pass through insulative portions of member 630. Contact tails associated with reference conductors may pass through lossy or conductive portions.

In some embodiments, the conductive portions may be compliant, such as may result from a conductive elastomer or other material that may be known in the art for forming a gasket. The compliant material may be thicker than the insulative portions of member 630. Such compliant material may be positioned to align with pads on a surface of a daughtercard to which connector 600 is to be attached. Those pads may be connected to reference structures within the printed circuit board such that, when connector 600 is attached to the printed circuit board, the compliant material makes contact with the reference pads on the surface of the printed circuit board.

The conductive or lossy portions of member 630 may be positioned to make electrical connection to reference conductors within connector 600. Such connections may be formed, for example, by contact tails of the reference conductors passing through the lossy of conductive portions. Alternatively or additionally, in embodiments in which the lossy or conductive portions are compliant, those portions may be positioned to press against the mating reference conductors when the connector is attached to a printed circuit board.

Mating contact portions of the wafers 700A are held in a front housing portion 640. The front housing portion may be made of any suitable material, which may be insulative, lossy or conductive or may include any suitable combination or such materials. For example the front housing portion may be molded from a filled, lossy material or may be formed from a conductive material, using materials and techniques similar to those described above for the housing walls 226. As shown, the wafers are assembled from modules 810A, 810B, 810C and 810D (FIG. 8), each with a pair of signal conductors surrounded by reference conductors. In the embodiment illustrated, front housing portion 640 has multiple passages, each positioned to receive one such pair of signal conductors and associated reference conductors. However, it should be appreciated that each module might contain a single signal conductor or more than two signal conductors.

Figure 7:
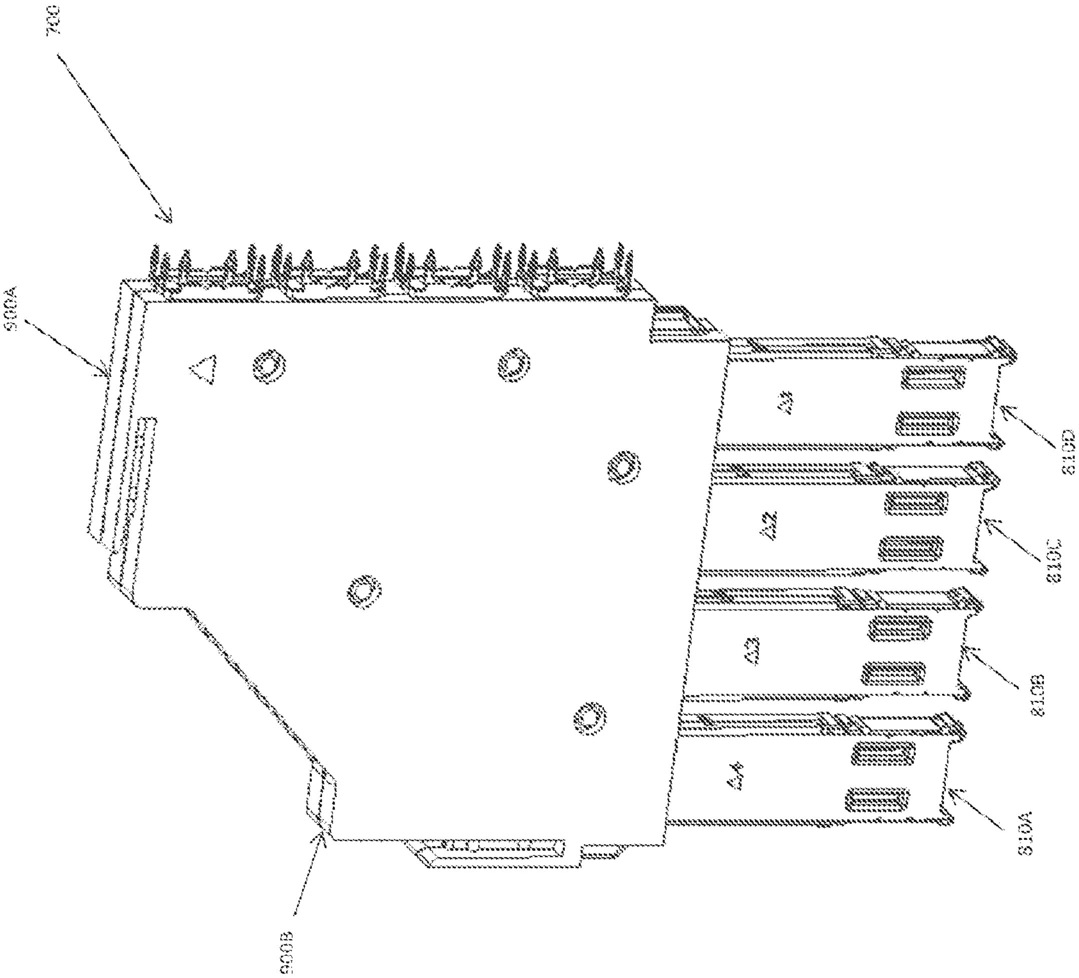
FIG. 7 is an isometric view of a wafer assembly of the daughtercard connector of FIG. 6.

FIG. 7 illustrates a wafer 700. Multiple such wafers may be aligned side-by-side and held together with one or more support members, or in any other suitable way, to form a daughtercard connector. In the embodiment illustrated, wafer 700 is formed from multiple modules 810A, 810B, 810C and 810D. The modules are aligned to form a column of mating contact portions along one edge of wafer 700 and a column of contact tails along another edge of wafer 700. In the embodiment in which the wafer is designed for use in a right angle connector, as illustrated, those edges are perpendicular.

In the embodiment illustrated, each of the modules includes reference conductors that at least partially enclose the signal conductors. The reference conductors may similarly have mating contact portions and contact tails.

The modules may be held together in any suitable way. For example, the modules may be held within a wafer housing, which in the embodiment illustrated is formed with members 900A and 900B. Members 900A and 900B may be formed separately and then secured together, capturing modules 810A . . . 810D between them. Members 900A and 900B may be held together in any suitable way, such as by attachment members that form an interference fit or a snap fit. Alternatively or additionally, adhesive, welding or other attachment techniques may be used.

Members 900A and 900B may be formed of any suitable material. That material may be an insulative material. Alternatively or additionally, that material may be or may include portions that are lossy or conductive. Members 900A and 900B may be formed, for example, by molding such materials into a desired shape. Alternatively, members 900A and 900B may be formed in place around modules 810A . . . 810D, such as via an insert molding operation. In such an embodiment, it is not necessary that members 900A and 900B be formed separately. Rather, the wafer housing portion to hold modules 810A . . . 810D may be formed in one operation.

FIG. 8 shows modules 810A . . . 810D without members 900A and 900B. In this view, the reference conductors are visible. Signal conductors (not visible in FIG. 8) are enclosed within the reference conductors, forming a waveguide structure. Each waveguide structure includes a contact tail region 820, an intermediate region 830 and a mating contact region 840. Within the mating contact region 840 and the contact tail region 820, the signal conductors are positioned edge to edge. Within the intermediate region 830, the signal conductors are positioned for broadside coupling. Transition regions 822 and 842 are provided to transition between the edge coupled orientation and the broadside coupled orientation.

The transition regions 822 and 842 in the reference conductors may correspond to transition regions in signal conductors, as described below. In the illustrated embodiment, reference conductors form an enclosure around the signal conductors. A transition region in the reference conductors, in some embodiments, may keep the spacing between the signal conductors and reference conductors generally uniform over the length of the signal conductors. Thus, the enclosure formed by the reference conductors may have different widths in different regions.

The reference conductors provide shielding coverage along the length of the signal conductors. As shown, coverage is provided over substantially all of the length of the signal conductors, with coverage in the mating contact portion and the intermediate portions of the signal conductors. The contact tails are shown exposed so that they can make contact with the printed circuit board. However, in use, these mating contact portions will be adjacent ground structures within a printed circuit board such that being exposed as shown in FIG. 8 does not detract from shielding coverage along substantially all of the length of the signal conductor.

In some embodiments, mating contact portions might also be exposed for mating to another connector. Accordingly, in some embodiments, shielding coverage may be provided over more than 80%, 85%, 90% or 95% of the intermediate portion of the signal conductors. Similarly shielding coverage may also be provided in the transition regions, such that shielding coverage may be provided over more than 80%, 85%, 90% or 95% of the combined length of the intermediate portion and transition regions of the signal conductors. In some embodiments, as illustrated, the mating contact regions and some or all of the contact tails may also be shielded, such that shielding coverage may be, in various embodiments, over more than 80%, 85%, 90% or 95% of the length of the signal conductors.

In the embodiment illustrated, a waveguide-like structure formed by the reference conductors has a wider dimension in the column direction of the connector in the contact tail regions 820 and the mating contact region 840 to accommodate for the wider dimension of the signal conductors being side-by-side in the column direction in these regions. In the embodiment illustrated, contact tail regions 820 and the mating contact region 840 of the signal conductors are separated by a distance that aligns them with the mating contacts of a mating connector or contact structures on a printed circuit board to which the connector is to be attached.

These spacing requirements mean that the waveguide will be wider in the column dimension than it is in the transverse direction, providing an aspect ratio of the waveguide in these regions that may be at least 2:1, and in some embodiments may be on the order of at least 3:1. Conversely, in the intermediate region 830, the signal conductors are oriented with the wide dimension of the signal conductors overlaid in the column dimension, leading to an aspect ratio of the waveguide that may be less than 2:1, and in some embodiments may be less than 1.5:1 or on the order of 1:1.

With this smaller aspect ratio, the largest dimension of the waveguide in the intermediate region 830 will be smaller than the largest dimension of the waveguide in regions 830 and 840. Because that the lowest frequency propagated by a waveguide is inversely proportional to the length of its shortest dimension, the lowest frequency mode of propagation that can be excited in intermediate region 830 is higher than can be excited in contact tail regions 820 and the mating contact region 840. The lowest frequency mode that can be excited in the transition regions will be intermediate between the two. Because the transition from edge coupled to broadside coupling has the potential to excite undesired modes in the waveguides, signal integrity may be improved if these modes are at higher frequencies than the intended operating range of the connector, or at least are as high as possible.

These regions may be configured to avoid mode conversion upon transition between coupling orientations, which would excite propagation of undesired signals through the waveguides. For example, as shown below, the signal conductors may be shaped such that the transition occurs in the intermediate region 830 or the transition regions 822 and 842, or partially within both. Additionally or alternatively, the modules may be structured to suppress undesired modes excited in the waveguide formed by the reference conductors, as described in greater detail below.

Though the reference conductors may substantially enclose each pair, it is not a requirement that the enclosure be without openings. Accordingly, in embodiments shaped to provide rectangular shielding, the reference conductors in the intermediate regions may be aligned with at least portions of all four sides of the signal conductors. The reference conductors may combine for example to provide 360 degree coverage around the pair of signal conductors. Such coverage may be provided, for example, by overlapping or physically contact reference conductors. In the illustrated embodiment, the reference conductors are U-shaped shells and come together to form an enclosure.

Three hundred sixty degree coverage may be provided regardless of the shape of the reference conductors. For example, such coverage may be provided with circular, elliptical or reference conductors of any other suitable shape. However, it is not a requirement that the coverage be complete. The coverage, for example, may have a second angular extent in the range between about 270 and 365 degrees. In some embodiments, the coverage may be in the range of about 340 to 360 degrees. Such coverage may be achieved for example, by slots or other openings in the reference conductors.

In some embodiments, the shielding coverage may be different in different regions. In the transition regions, the shielding coverage may be greater than in the intermediate regions. In some embodiments, the shielding coverage may have a first angular extent of greater than 355 degrees, or even in some embodiments 360 degrees, resulting from direct contact, or even overlap, in reference conductors in the transition regions even if less shielding coverage is provided in the transition regions.

The inventors have recognized and appreciated that, in some sense, fully enclosing a signal pair in reference conductors in the intermediate regions may create effects that undesirably impact signal integrity, particularly when used in connection with a transition between edge coupling and broadside coupling within a module. The reference conductors surrounding the signal pair may form a waveguide. Signals on the pair, and particularly within a transition region between edge coupling and broadside coupling, may cause energy from the differential mode of propagation between the edges to excite signals that can propagate within the waveguide. In accordance with some embodiments, one or more techniques to avoid exciting these undesired modes, or to suppress them if they are excited, may be used.

Some techniques that may be used to increase the frequency that will excite the undesired modes. In the embodiment illustrated, the reference conductors may be shaped to leave openings 832. These openings may be in the narrower wall of the enclosure. However, in embodiments in which there is a wider wall, the openings may be in the wider wall. In the embodiment illustrated, openings 832 run parallel to the intermediate portions of the signal conductors and are between the signal conductors that form a pair. These slots lower the angular extent of the shielding, such that, adjacent the broadside coupled intermediate portions of the signal conductors, the angular extent of the shielding may be less than 360 degrees. It may, for example, be in the range of 355 of less. In embodiments in which members 900A and 900B are formed by over molding lossy material on the modules, lossy material may be allowed to fill openings 832, with or without extending into the inside of the waveguide, which may suppress propagation of undesired modes of signal propagation, that can decrease signal integrity.

In the embodiment illustrated in FIG. 8, openings 832 are slot shaped, effectively dividing the shielding in half in intermediate region 830. The lowest frequency that can be excited in a structure serving as a waveguide—as is the effect of the reference conductors that substantially surround the signal conductors as illustrated in FIG. 8—is inversely proportional to the dimensions of the sides. In some embodiments, the lowest frequency waveguide mode that can be excited is a TEM mode. Effectively shortening a side by incorporating slot-shaped opening 832, raises the frequency of the TEM mode that can be excited. A higher resonant frequency can mean that less energy within the operating frequency range of the connector is coupled into undesired propagation within the waveguide formed by the reference conductors, which improves signal integrity.

In region 830, the signal conductors of a pair are broadside coupled and the openings 832, with or without lossy material in them, may suppress TEM common modes of propagation. While not being bound by any particular theory of operation, the inventors theorize that openings 832, in combination with an edge coupled to broadside coupled transition, aids in providing a balanced connector suitable for high frequency operation.

Figure 9:
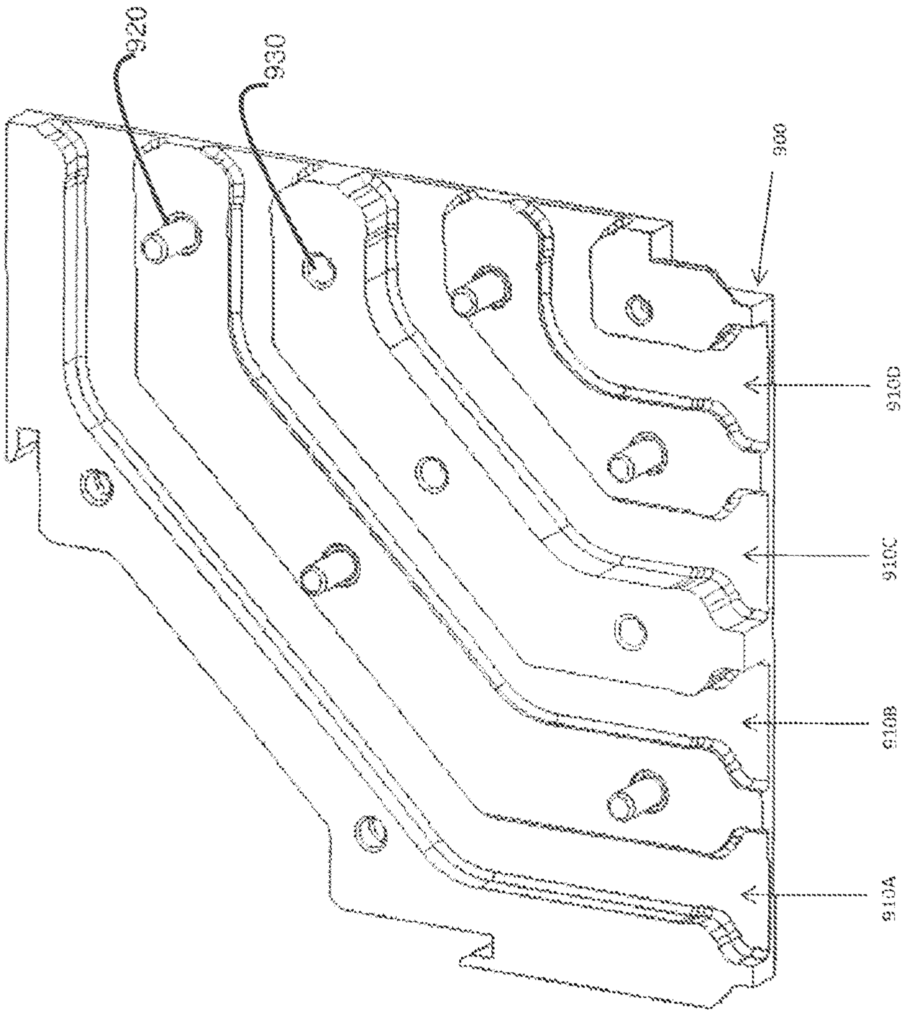
FIG. 9 is an isometric view of a portion of the insulative housing of the wafer assembly of FIG. 7.

FIG. 9 illustrates a member 900, which may be a representation of member 900A or 900B. As can be seen, member 900 is formed with channels 910A . . . 910D shaped to receive modules 810A . . . 810D shown in FIG. 8. With the modules in the channels, member 900A may be secured to member 900B. In the illustrated embodiment, attachment of members 900A and 900B may be achieved by posts, such as post 920, in one member, passing through a hole, such as hole 930, in the other member. The post may be welded or otherwise secured in the hole. However, any suitable attachment mechanism may be used.

Members 900A and 900B may be molded from or include a lossy material. Any suitable lossy material may be used for these and other structures that are "lossy." Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 siemen/meter to about 100,000 siemens/meter and preferably about 1 siemen/meter to about 10,000 siemens/meter. In some embodiments material with a bulk conductivity of between about 10 siemens/meter and about 200 siemens/meter may be used. As a specific example, material with a conductivity of about 50 siemens/meter may be used. However, it should be appreciated that the conductivity of the material may be selected empirically or through electrical simulation using known simulation tools to determine a suitable conductivity that provides both a suitably low crosstalk with a suitably low signal path attenuation or insertion loss.

Electrically lossy materials may be partially conductive materials, such as those that have a surface resistivity between 1.OMEGA./square and 100,000.OMEGA./square. In some embodiments, the electrically lossy material has a surface resistivity between 10.OMEGA./square and 1000.OMEGA./square. As a specific example, the material may have a surface resistivity of between about 20.OMEGA./square and 80.OMEGA./square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Mass., US may also be used. This preform can include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy member may be manufactured by stamping a preform or sheet of lossy material. For example, an insert may be formed by stamping a preform as described above with an appropriate pattern of openings. However, other materials may be used instead of or in addition to such a preform. A sheet of ferromagnetic material, for example, may be used.

However, lossy members also may be formed in other ways. In some embodiments, a lossy member may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together.

Figure 10:
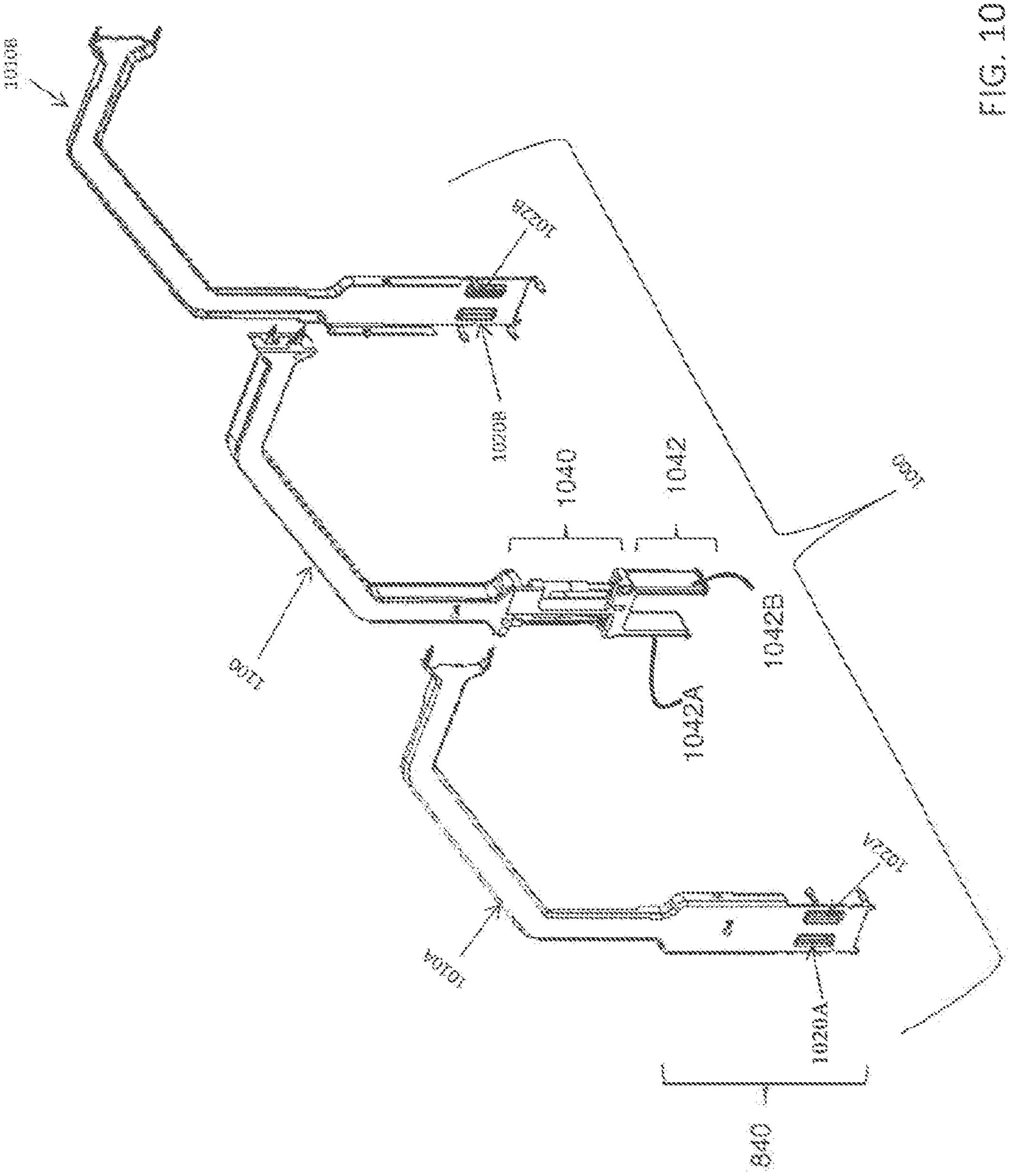
FIG. 10 is an isometric view, partially exploded, of a wafer module of the wafer assembly of FIG. 7.

FIG. 10 shows further details of construction of a module 1000 of a wafer. Module 1000 may be representative of any of the modules in a connector, such as any of the modules 810A . . . 810D shown in FIGS. 7-8. Each of the modules 810A . . . 810D may have the same general construction, and some portions may be the same for all modules. For example, the contact tail regions 820 and mating contact regions 840 may be the same for all modules. Each module may include an intermediate portion region 830, but the length and shape of the intermediate portion region 830 may vary depending on the location of the module within the wafer.

In the embodiment illustrated, module 1000 includes a pair of conductive elements 1310A and 1310B (FIG. 13) held within an insulative housing portion 1100. In some embodiments, conductive elements 1310A and 1310B may be signal conductors. Insulative housing portion 1100 is enclosed, at least partially, by reference conductors 1010A and 1010B. This subassembly may be held together in any suitable way. For example, reference conductors 1010A and 1010B may have features that engage one another. Alternatively or additionally, reference conductors 1010A and 1010B may have features that engage insulative housing portion 1100. As yet another example, the reference conductors may be held in place once members 900A and 900B are secured together as shown in FIG. 7.

The exploded view of FIG. 10 reveals that mating contact region 840 includes subregions 1040 and 1042. Subregion 1040 includes mating contact portions of module 1000. When mated with a pin module 300, mating contact portions from the pin module will enter subregion 1040 and engage the mating contact portions of module 1000. These components may be dimensioned to support a "functional mating range," such that, if the module 300 and module 1000 are fully pressed together, the mating contact portions of module 1000 will slide along the pins from pin module 300 by the "functional mating range" distance during mating.

The impedance of the signal conductors in subregion 1040 will be largely defined by the structure of module 1000. The separation of signal conductors of the pair as well as the separation of the signal conductors from reference conductors 1010A and 1010B will set the impedance. The dielectric constant of the material surrounding the signal conductors, which in this embodiment is air, will also impact the impedance. In accordance with some embodiments, design parameters of module 1000 may be selected to provide a nominal impedance within region 1040. That impedance may be designed to match the impedance of other portions of module 1000, which in turn may be selected to match the impedance of a printed circuit board or other portions of the interconnection system such that the connector does not create impedance discontinuities.

If the modules 300 and 1000 are in their nominal mating position, which in this embodiment is fully pressed together, the pins will be within mating contact portions of the signal conductors of module 1000. The impedance of the signal conductors in subregion 1040 will still be driven largely by the configuration of subregion 1040, providing a matched impedance to the rest of module 1000.

A subregion 340 (FIG. 3) may exist within pin module 300. In subregion 340, the impedance of the signal conductors will be dictated by the construction of pin module 300. The impedance will be determined by the separation of signal conductors 314A and 314B as well as their separation from reference conductors 320A and 320B. The dielectric constant of insulative member 410 may also impact the impedance. Accordingly, these parameters may be selected to provide, within subregion 340, an impedance, which may be designed to match the nominal impedance in subregion 1040.

The impedance in subregions 340 and 1040, being dictated by construction of the modules, is largely independent of any separation between the modules during mating. However, modules 300 and 1000 have, respectively, subregions 342 and 1042 that interact with components from the mating module that could influence impedance. Because the positioning of these components could influence impedance, the impedance could vary as a function of separation of the mating modules. In some embodiments, these components are positioned to reduce changes of impedance, regardless of separation distance, or to reduce the impact of changes of impedance by distributing the change across the mating region.

When pin module 300 is pressed fully against module 1000, the components in subregions 342 and 1042 may combine to provide the nominal mating impedance. Because the modules are designed to provide functional mating range, signal conductors within pin module 300 and module 1000 may mate, even if those modules are separated by an amount that equals the functional mating range, such that separation between the modules can lead to changes in impedance, relative to the nominal value, at one or more places along the signal conductors in the mating region. Appropriate shape and positioning of these members can reduce that change or reduce the effect of the change by distributing it over portions of the mating region.

In the embodiments illustrated in FIG. 3 and FIG. 10, subregion 1042 is designed to overlap pin module 300 when module 1000 is pressed fully against pin module 300. Projecting insulative members 1042A and 1042B are sized to fit within spaces 342A and 342B, respectively. With the modules pressed together, the distal ends of insulative members 1042A and 1042B press against surfaces 450 (FIG. 4). Those distal ends may have a shape complementary to the taper of surfaces 450 such that insulative members 1042A and 1042B fill spaces 342A and 342B, respectively. That overlap creates a relative position of signal conductors, dielectric, and reference conductors that may approximate the structure within subregion 340. These components may be sized to provide the same impedance as in subregion 340 when modules 300 and 1000 are fully pressed together. When the modules are fully pressed together, which in this example is the nominal mating position, the signal conductors will have the same impedance across the mating region made up by subregions 340, 1040 and where subregions 342 and 1042 overlap.

These components also may be sized and may have material properties that provide impedance control as a function of separation of modules 300 and 1000. Impedance control may be achieved by providing approximately the same impedance through subregions 342 and 1042, even if those subregions do not fully overlap, or by providing gradual impedance transitions, regardless of separation of the modules.

In the illustrated embodiment, this impedance control is provided in part by projecting insulative members 1042A and 1042B, which fully or partially overlap pin module 300, depending on separation between modules 300 and 1000. These projecting insulative members can reduce the magnitude of changes in relative dielectric constant of material surrounding pins from pin module 300. Impedance control is also provided by projections 1020A and 1022A and 1020B and 1022B in the reference conductors 1010A and 1010B. These projections impact the separation, in a direction perpendicular to the axis of the signal conductor pair, between portions of the signal conductor pair and the reference conductors 1010A and 1010B. This separation, in combination with other characteristics, such as the width of the signal conductors in those portions, may control the impedance in those portions such that it approximates the nominal impedance of the connector or does not change abruptly in a way that may cause signal reflections. Other parameters of either or both mating modules may be configured for such impedance control.

Figure 11:
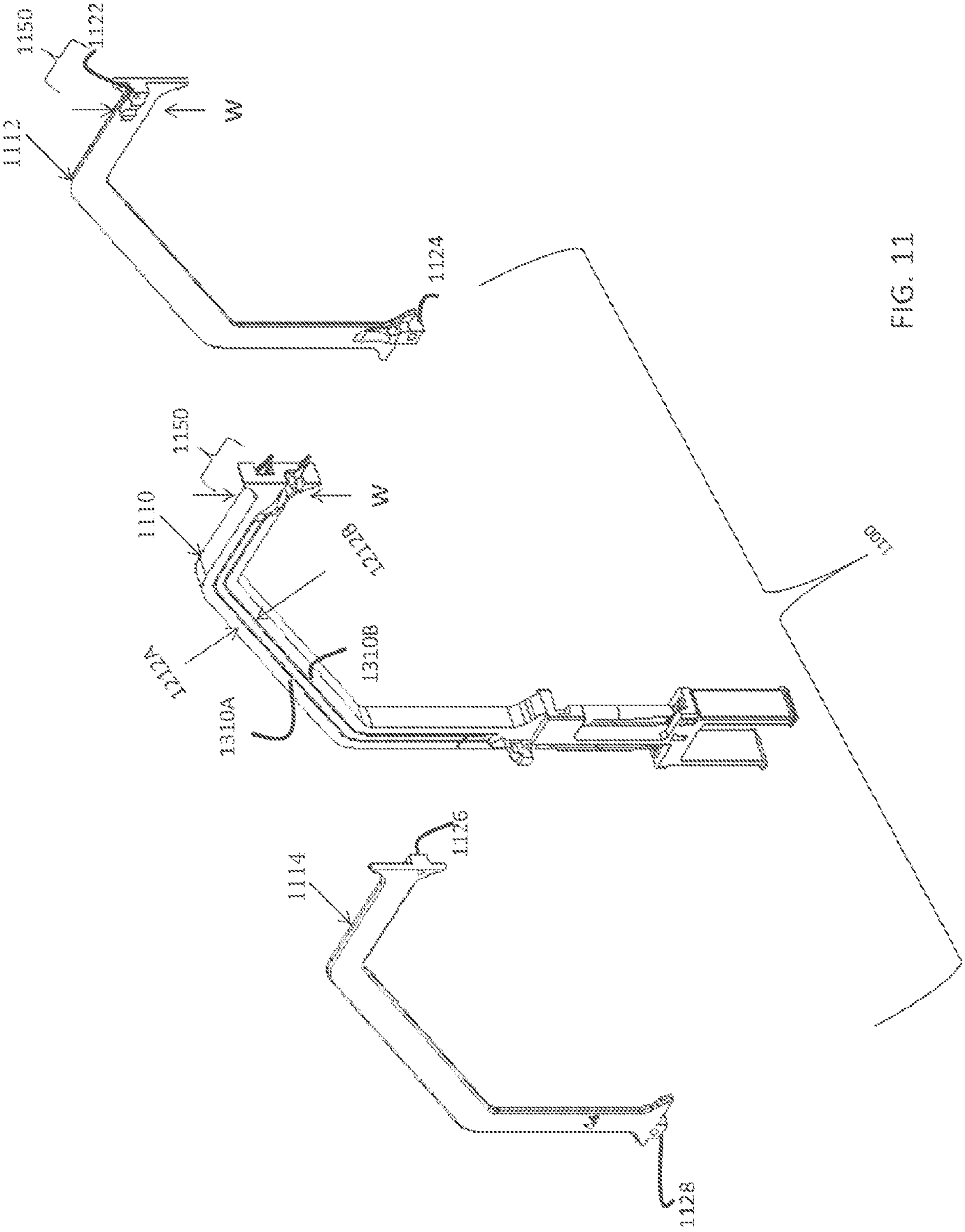
FIG. 11 is an isometric view, partially exploded, of a portion of a wafer module of the wafer assembly of FIG. 7.

Turning to FIG. 11, further details of exemplary components of a module 1000 are illustrated. FIG. 11 is an exploded view of module 1000, without reference conductors 1010A and 1010B shown. Insulative housing portion 1100 is, in the illustrated embodiment, made of multiple components. Central member 1110 may be molded from insulative material. Central member 1110 includes two grooves 1212A and 1212B into which conductive elements 1310A and 1310B, which in the illustrated embodiment form a pair of signal conductors, may be inserted.

Covers 1112 and 1114 may be attached to opposing sides of central member 1110. Covers 1112 and 1114 may aid in holding conductive elements 1310A and 1310B within grooves 1212A and 1212B and with a controlled separation from reference conductors 1010A and 1010B. In the embodiment illustrated, covers 1112 and 1114 may be formed of the same material as central member 1110. However, it is not a requirement that the materials be the same, and in some embodiments, different materials may be used, such as to provide different relative dielectric constants in different regions to provide a desired impedance of the signal conductors.

In the embodiment illustrated, grooves 1212A and 1212B are configured to hold a pair of signal conductors for edge coupling at the contact tails and mating contact portions. Over a substantial portion of the intermediate portions of the signal conductors, the pair is held for broadside coupling. To transition between edge coupling at the ends of the signal conductors to broadside coupling in the intermediate portions, a transition region may be included in the signal conductors. Grooves in central member 1110 may be shaped to provide the transition region in the signal conductors. Projections 1122, 1124, 1126 and 1128 on covers 1112 and 1114 may press the conductive elements against central portion 1110 in these transition regions.

In the embodiment illustrated in FIG. 11, it can be seen that the transition between broadside and edge coupling occurs over a region 1150. At one end of this region, the signal conductors are aligned edge-to-edge in the column direction in a plane parallel to the column direction. Traversing region 1150 in towards the intermediate portion, the signal conductors jog in opposition direction perpendicular to that plane and jog towards each other. As a result, at the end of region 1150, the signal conductors are in separate planes parallel to the column direction. The intermediate portions of the signal conductors are aligned in a direction perpendicular to those planes.

Region 1150 includes the transition region, such as 822 or 842 where the waveguide formed by the reference conductor transitions from its widest dimension to the narrower dimension of the intermediate portion, plus a portion of the narrower intermediate region 830. As a result, at least a portion of the waveguide formed by the reference conductors in this region 1150 has a widest dimension of W, the same as in the intermediate region 830. Having at least a portion of the physical transition in a narrower part of the waveguide reduces undesired coupling of energy into waveguide modes of propagation.

Having full 360 degree shielding of the signal conductors in region 1150 may also reduce coupling of energy into undesired waveguide modes of propagation. Accordingly, openings 832 do not extend into region 1150 in the embodiment illustrated.

Figure 12:
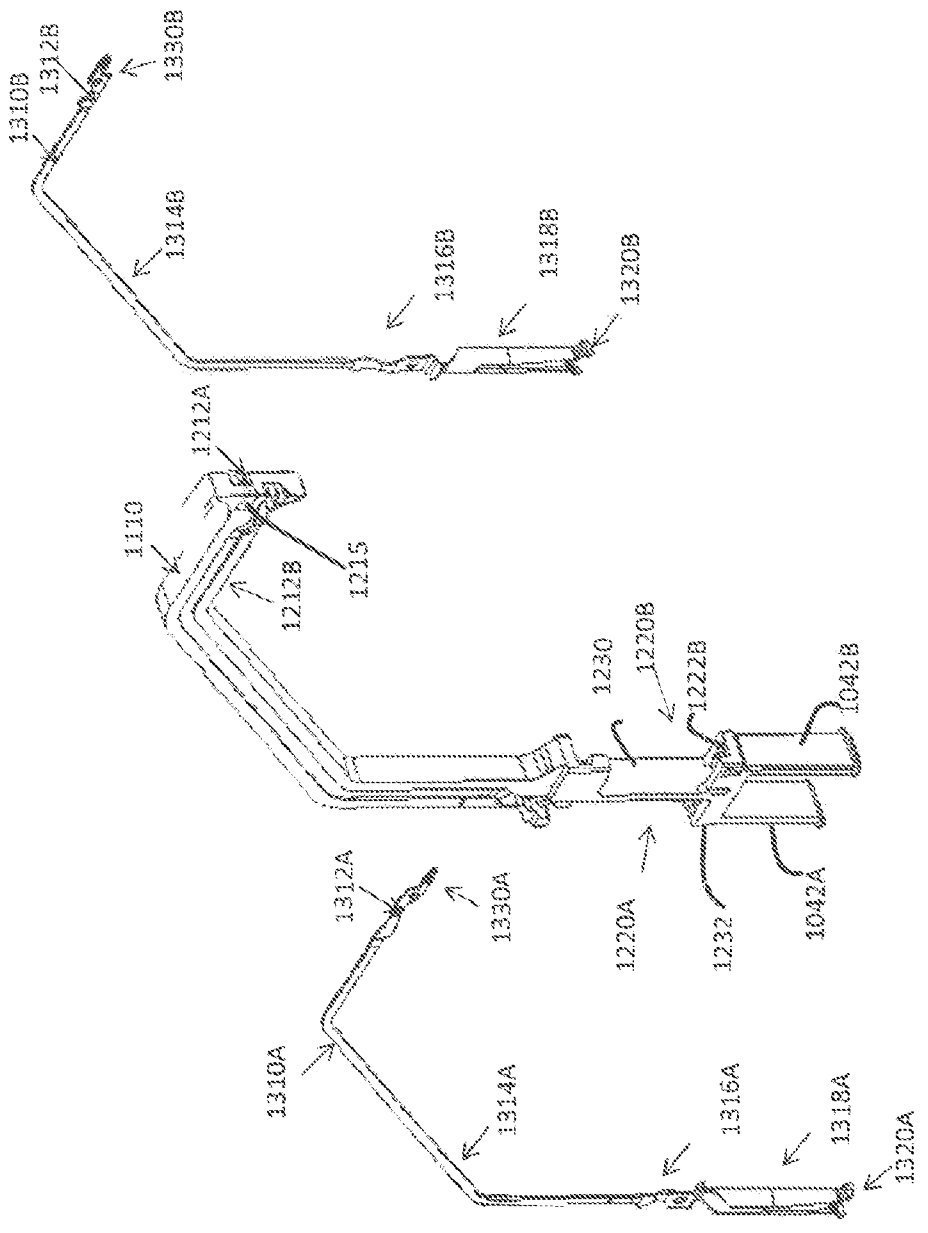
FIG. 12 is an isometric view, partially exploded, of a portion of a wafer module of the wafer assembly of FIG. 7.

FIG. 12 shows further detail of a module 1000. In this view, conductive elements 1310A and 1310B are shown separated from central member 1110. For clarity, covers 1112 and 1114 are not shown. Transition region 1312A between contact tail 1330A and intermediate portion 1314A is visible in this view. Similarly, transition region 1316A between intermediate portion 1314A and mating contact portion 1318A is also visible. Similar transition regions 1312B and 1316B are visible for conductive element 1310B, allowing for edge coupling at contact tails 1330B and mating contact portions 1318B and broadside coupling at intermediate portion 1314B.

The mating contact portions 1318A and 1318B may be formed from the same sheet of metal as the conductive elements. However, it should be appreciated that, in some embodiments, conductive elements may be formed by attaching separate mating contact portions to other conductors to form the intermediate portions. For example, in some embodiments, intermediate portions may be cables such that the conductive elements are formed by terminating the cables with mating contact portions.

In the embodiment illustrated, the mating contact portions are tubular. Such a shape may be formed by stamping the conductive element from a sheet of metal and then forming to roll the mating contact portions into a tubular shape. The circumference of the tube may be large enough to accommodate a pin from a mating pin module, but may conform to the pin. The tube may be split into two or more segments, forming compliant beams. Two such beams are shown in FIG. 12. Bumps or other projections may be formed in distal portions of the beams, creating contact surfaces. Those contact surfaces may be coated with gold or other conductive, ductile material to enhance reliability of an electrical contact.

When conductive elements 1310A and 1310B are mounted in central member 1110, mating contact portions 1318A and 1318B fit within openings 1220A 1220B. The mating contact portions are separated by wall 1230. The distal ends 1320A and 1320B of mating contact portions 1318A and 1318 B may be aligned with openings, such as opening 1222B, in platform 1232. These openings may be positioned to receive pins from the mating pin module 300. Wall 1230, platform 1232 and insulative projecting members 1042A and 1042B may be formed as part of portion 1110, such as in one molding operation. However, any suitable technique may be used to form these members.

FIG. 12 shows a further technique that may be used, instead of or in addition to techniques described above, for reducing energy in undesired modes of propagation within the waveguides formed by the reference conductors in transition regions 1150. Conductive or lossy material may be integrated into each module so as to reduce excitation of undesired modes or to damp undesired modes. FIG. 12, for example, shows lossy region 1215. Lossy region 1215 may be configured to fall along the center line between conductive elements 1310A and 1310B in some or all of region 1150. Because conductive elements 1310A and 1310B jog in different directions through that region to implement the edge to broadside transition, lossy region 1215 may not be bounded by surfaces that are parallel or perpendicular to the walls of the waveguide formed by the reference conductors. Rather, it may be contoured to provide surfaces equidistant from the edges of the conductive elements 1310A and 1310B as they twist through region 1150. Lossy region 1215 may be electrically connected to the reference conductors in some embodiments. However, in other embodiments, the lossy region 1215 may be floating.

Though illustrated as a lossy region 1215, a similarly positioned conductive region may also reduce coupling of energy into undesired waveguide modes that reduce signal integrity. Such a conductive region, with surfaces that twist through region 1150, may be connected to the reference conductors in some embodiments. While not being bound by any particular theory of operation, a conductor, acting as a wall separating the signal conductors and as such twists to follow the twists of the signal conductors in the transition region, may couple ground current to the waveguide in such a way as to reduce undesired modes. For example, the current may be coupled to flow in a differential mode through the walls of the reference conductors parallel to the broadside coupled signal conductors, rather than excite common modes.

Figure 13:
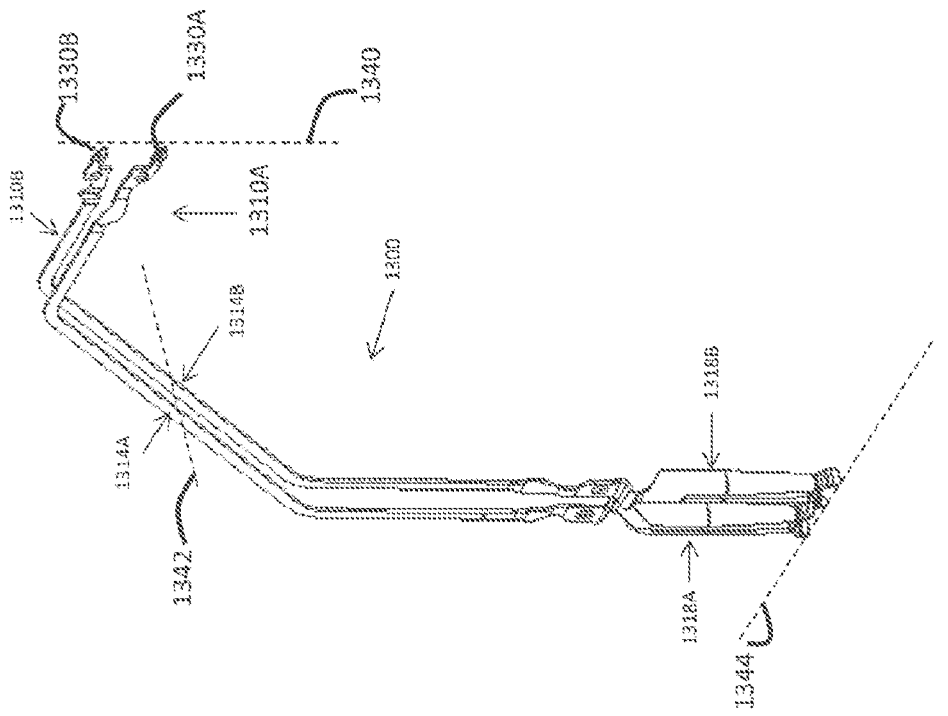
FIG. 13 is an isometric view of a pair of conducting elements of a wafer module of the wafer assembly of FIG. 7.

FIG. 13 shows in greater detail the positioning of conductive elements 1310A and 1310B, forming a pair 1300 of signal conductors. In the embodiment illustrated, conductive elements 1310A and 1310B each have edges and broader sides between those edges. Contact tails 1330A and 1330B are aligned in a column 1340. With this alignment, edges of conductive elements 1310A and 1310B face each other at the contact tails 1330A and 1330B. Other modules in the same wafer will similarly have contact tails aligned along column 1340. Contact tails from adjacent wafers will be aligned in parallel columns. The space between the parallel columns creates routing channels on the printed circuit board to which the connector is attached. Mating contact portions 1318A and 1318B are aligned along column 1344. Though the mating contact portions are tubular, the portions of conductive elements 1310A and 1310B to which mating contact portions 1318A and 1318B are attached are edge coupled. Accordingly, mating contact portions 1318A and 1318B may similarly be said to be edge coupled.

In contrast, intermediate portions 1314A and 1314B are aligned with their broader sides facing each other. The intermediate portions are aligned in the direction of row 1342. In the example of FIG. 13, conductive elements for a right angle connector are illustrated, as reflected by the right angle between column 1340, representing points of attachment to a daughtercard, and column 1344, representing locations for mating pins attached to a backplane connector.

In a conventional right angle connector in which edge coupled pairs are used within a wafer, within each pair the conductive element in the outer row at the daughtercard is longer. In FIG. 13, conductive element 1310B is attached at the outer row at the daughtercard. However, because the intermediate portions are broadside coupled, intermediate portions 1314A and 1314B are parallel throughout the portions of the connector that traverse a right angle, such that neither conductive element is in an outer row. Thus, no skew is introduced as a result of different electrical path lengths.

Moreover, in FIG. 13, a further technique for avoiding skew is introduced. While the contact tail 1330B for conductive element 1310B is in the outer row along column 1340, the mating contact portion of conductive element 1310B (mating contact portion 1318 B) is at the shorter, inner row along column 1344. Conversely, contact tail 1330A of the conductive element 1310A is at the inner row along column 1340 but mating contact portion 1318A of conductive element 1310A is in the outer row along column 1344. As a result, longer path lengths for signals traveling near contact tails 1330B relative to 1330A may be offset by shorter path lengths for signals traveling near mating contact portions 1318B relative to mating contact portion 1318A. Thus, the technique illustrated may further reduce skew.

Figure 14A:
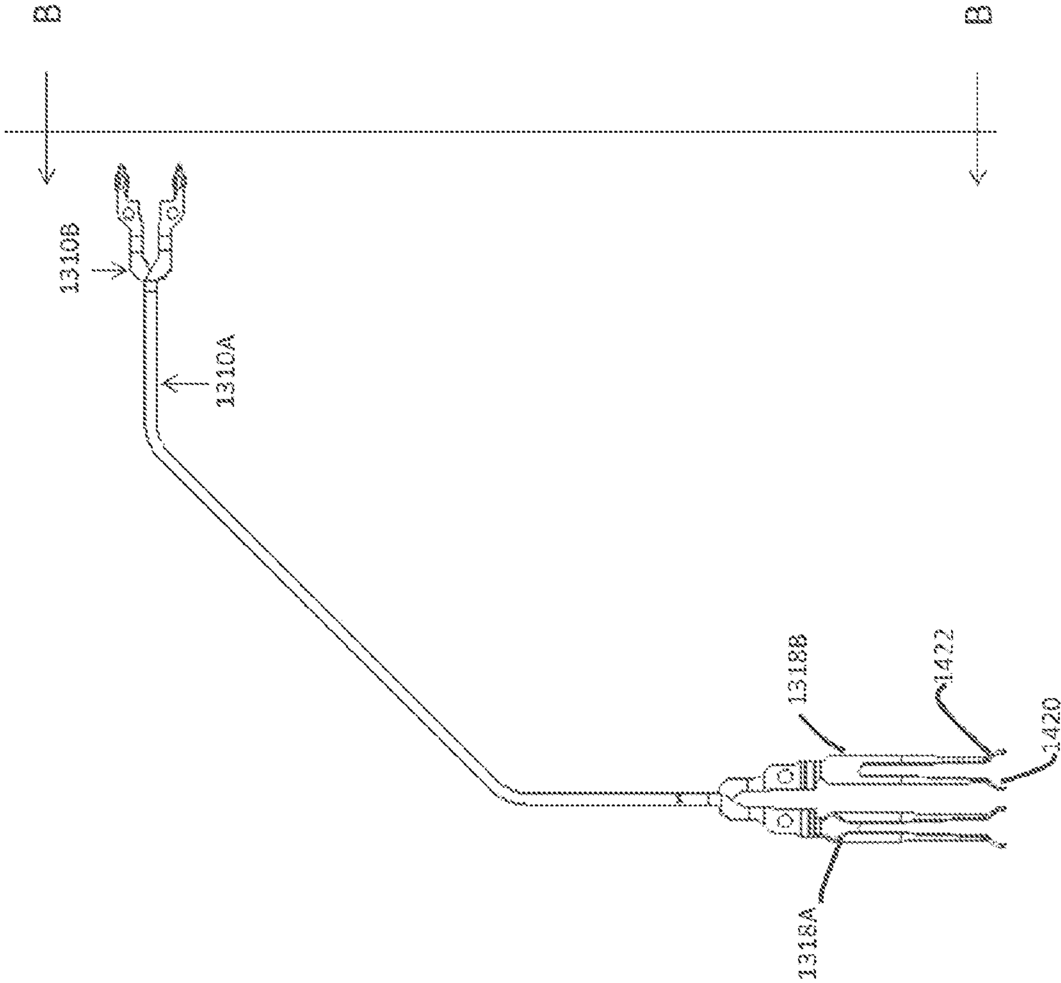
FIG. 14A is a side view of the pair of conducting elements of FIG. 13.
Figure 14B:
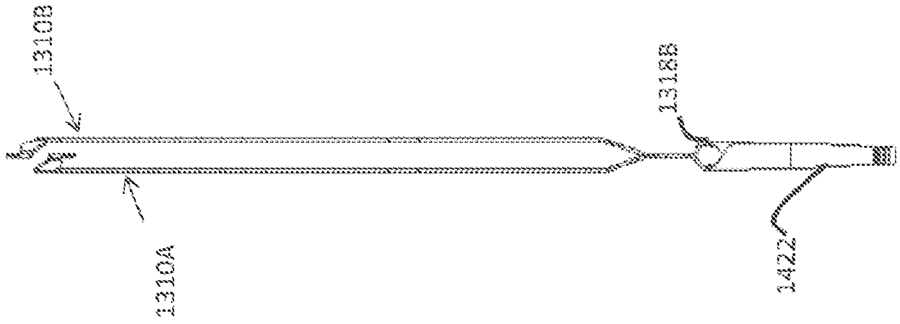
FIG. 14B is an end view of the pair of conducting elements of FIG. 13 taken along the line B-B of FIG. 14A.

FIGS. 14A and 14B illustrate the edge and broadside coupling within the same pair of signal conductors. FIG. 14A is a side view, looking in the direction of row 1342. FIG. 14B is an end view, looking in the direction of column 1344. FIGS. 14A and 14B illustrate the transition between edge coupled mating contact portions and contact tails and broadside coupled intermediate portions.

Additional details of mating contact portions such as 1318A and 1318B are also visible. The tubular portion of mating contact portion 1318A is visible in the view shown in FIG. 14A and of mating contact portion 1318B in the view shown in FIG. 14B. Beams, of which beams 1420 and 1422 of mating contact portion 1318B are numbered, are also visible.

Figure 15C:
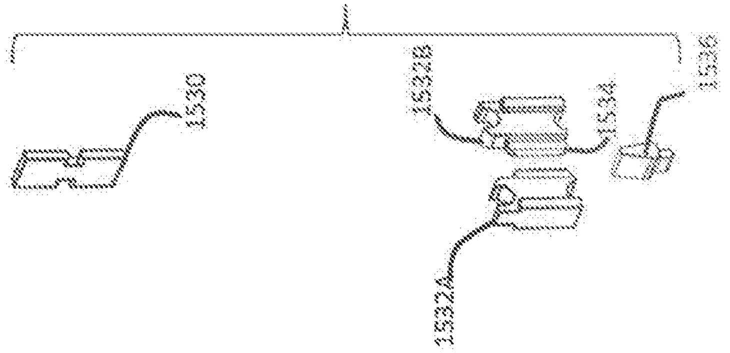
FIGS. 15A-15C illustrate an alternative embodiment of a connector module with inserts within an enclosure formed by reference conductors substantially surrounding a pair of signal conductors.
Figure 15B:
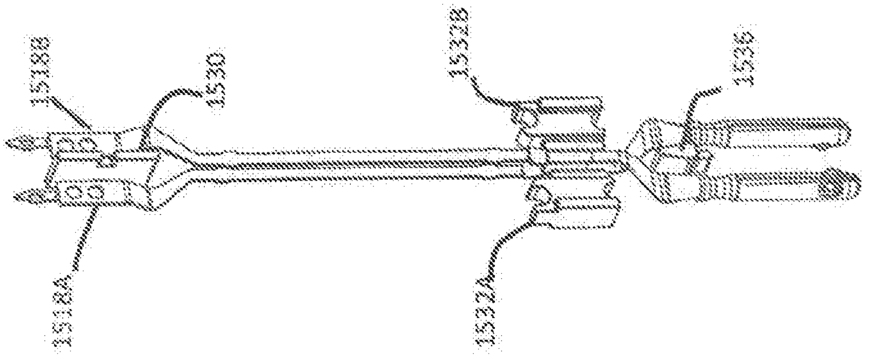
Figure 15A:
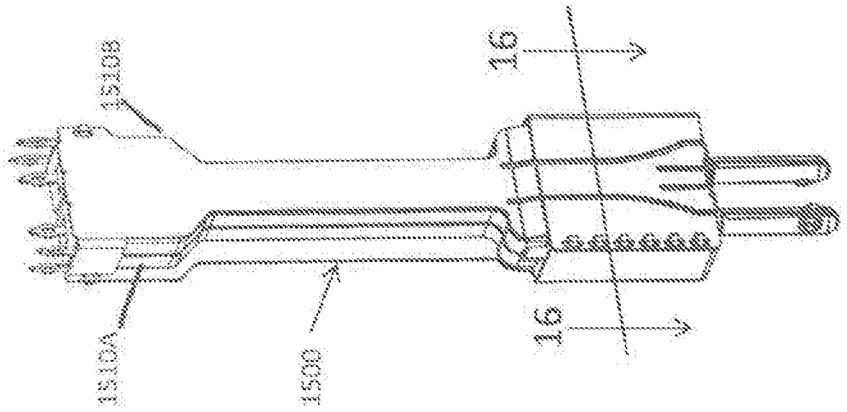

FIGS. 15A-15C illustrate an alternative embodiment of a module 1500 of a wafer that may be combined with other wafers in a two dimensional array to form a connector. In the embodiment illustrated, the wafer module 1500 is shown without right angle intermediate portions. Such a wafer module, for example, may be used as a cable connector or as a stacking connector. Alternatively, such a module may be formed with a right angle section to make a backplane connector as illustrated above.

Module 1500 may employ techniques to reduce excitation of undesirable modes in reference conductors surrounding a pair of signal conductors. The techniques described in connection with module 1500 may be used instead of or in addition to the techniques described herein. Likewise, the techniques described herein, even though described in connection with other embodiments, may be used in connection with module 1500.

Module 1500 may be formed with construction techniques as described herein or in any other suitable way. In the embodiment of FIG. 15A, module 1500 is substantially surrounded by reference conductors 1510A and 1510B that form reference conductors. Those reference conductors may, as described above, fully surround signal conductors in transition regions and be separate by a slot in intermediate portions where the signal conductors are broadside coupled.

The signal conductors may be held within an enclosure formed by the reference conductors by insulative material (not visible in FIG. 15A). FIG. 15B is an exploded view of a pair of signal conductors 1518A and 1518B, with the reference conductors and insulative material cutaway. The edge couple ends of the signal conductors, the broadside coupled intermediate portions and transition regions between the edge and broadside coupled regions are visible.

In the embodiment illustrated, module 1500 may use selectively positioned regions of lossy or conductive material to reduce coupling of signal energy to a waveguide mode in a transition. Accordingly, lossy regions 1530, 1532, and 1536 are visible. Each of these lossy regions may be positioned to reduce excitation of undesired waveguide modes, such as the TEM mode, within the waveguide formed by reference conductors 1510A and 1510B. These lossy regions may be formed in any suitable way. In some embodiments, the lossy regions may be formed as separate members that are inserted into openings of the insulative portions of the module 1500 or otherwise attached in a position relative to either the signal conductors and/or the reference conductors. Alternatively or additionally, the lossy members may be formed with openings that receive projections from reference conductors. For example, lossy members 1532A and 1532B are illustrated with openings that form portions of a circle. Those openings may be fitted over post-like projections to hold the lossy members in place. The converse, with projections from the lossy members fitting into projections of other members, may also be used. Alternatively or additionally, lossy regions may be formed by a two shot molding operation or may be formed by otherwise depositing material in a fluid state in a desired state. For example, an epoxy body filled with particles as described above, may be deposited and cured in place.

In the embodiment illustrated, lossy member 1530 is generally planar and is inserted between the edge coupled ends of the signal conductors near the contact tails. Lossy member 1530 extends in a plane perpendicular to the broadsides of the portions of the signal conductors to which it is adjacent.

Lossy member 1536 also may be inserted between the mating contact portions. Here lossy member 1536 is not planar, but has wider and narrower portions arising from surface that follow the contours of the mating contact portions as the mating contact portions become further apart. Though not shown, lossy members 1530 and 1536 may be in contact with the reference conductors.

Lossy members 1532A and 1532B are shown disposed within the rectangular portions in the intermediate portions of the waveguide. As can be seen, these lossy members extend over a portion of the intermediate portion. That portion may be between 5 and 50 percent of the intermediate portion of the signal conductors. In some embodiments, lossy members 1532A and 1532B extend over 10-25% of the intermediate portion. Without being bound by any particular theory of operation, lossy members 1532A and 1532B may add loss in the waveguide, which reduces any unwanted modes that might be excited. Additionally, lossy members 1532A and 1532B are shaped with projections 1534 extending towards the centerline between the broadside coupled signal conductors. These projections enforce a differential coupling between the broadsides, which is a desired mode of signal propagation.

Figure 16:
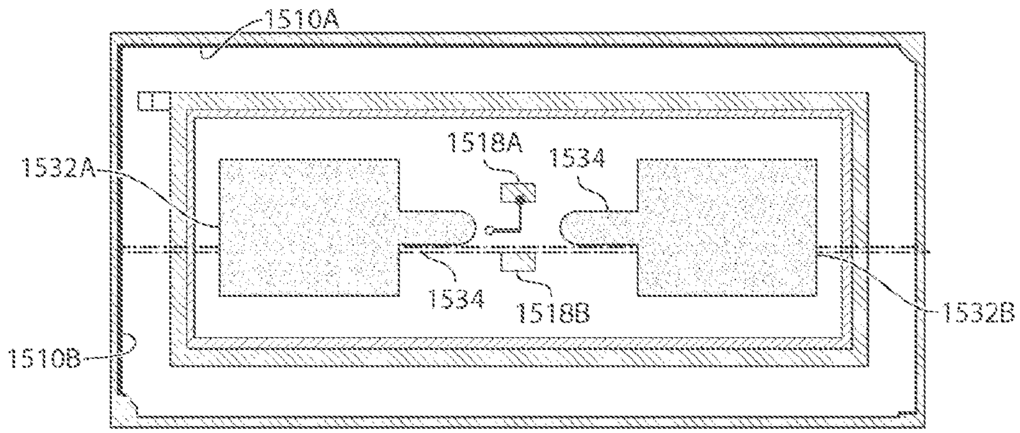
FIG. 16 illustrates a cross section of the module of FIGS. 15A-15C through the line indicated 16-16 in FIG. 15A.

A cross-section of module 1500, taken along the line 16-16 (FIG. 15A) is shown in FIG. 16. Signals conductors 1518A and 1518B are shown with broadside coupling. Reference conductors 1510A and 1510B cooperate to provide shielding substantially surrounding the signal conductors. In this section, 360 degree shielding is shown. As can be seen, lossy members 1532A and 1532B are within the waveguide formed by reference conductors 1510A and 1510B. In this embodiment, the lossy members 1532A and 1532B, exclusive of projections 1534, occupy a portion of the waveguide approximating the difference between the width of the waveguide in the transition region and the width in the intermediate region.

Projections 1534, extend towards the signal conductors in a direction parallel to the broadsides. These extending portions may impact the electric fields in the vicinity of the signal conductors, tending to create a null in the electric field pattern on the center line between the signal conductors. Such a null is characteristic of a differential mode of propagation on the signal conductors, which is a desired mode of propagation. In this way, the projections 1534 may enforce a desired mode of propagation.

Returning to FIG. 15C, as shown, lossy members 1532A and 1532B are installed in the transition region of the reference conductors. This transition region is wider, and can accommodate an additional member without enlarging the dimensions of the waveguide, which itself might produce undesirable effects on signal integrity. Positioning the lossy members in this transition region may preclude unwanted resonances from being excited rather than suppressing them after they are generated, which may also be preferable in some embodiments. It should be appreciated, however, that lossy members may be positioned in other locations within the waveguide formed by the reference conductors. For example, a lossy coating may be applied to the reference conductors. Alternatively or additionally, lossy material, flush with the walls of the waveguide may be exposed through openings in the reference conductors, as described above.

Moreover, it is not a requirement that the inserts be made of lossy material. Because the inserts may shape electric and/or magnetic fields associated with signals propagating through the transition for edge coupling to broadside coupling, that benefit may be achieved with conductive structures shaped and/or positioned like inserts 1530, 1532A, 1532B and/or 1536.

Figure 17B:
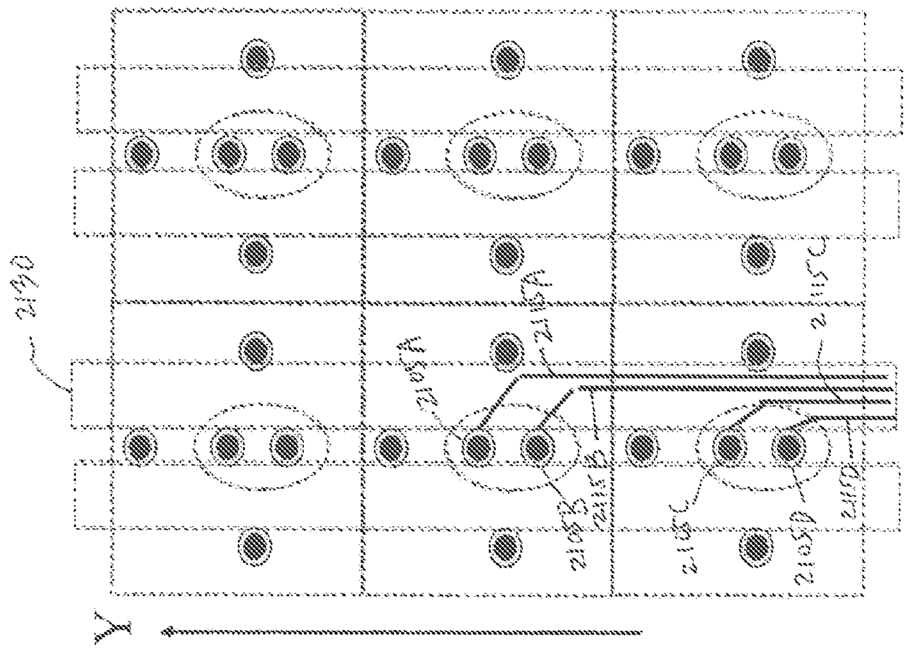
FIGS. 17A and 17B illustrate wide routing channels within a connector footprint on a printed circuit board resulting from edge coupled contact tails of a connector with broadside coupled intermediate portions.
Figure 17A:
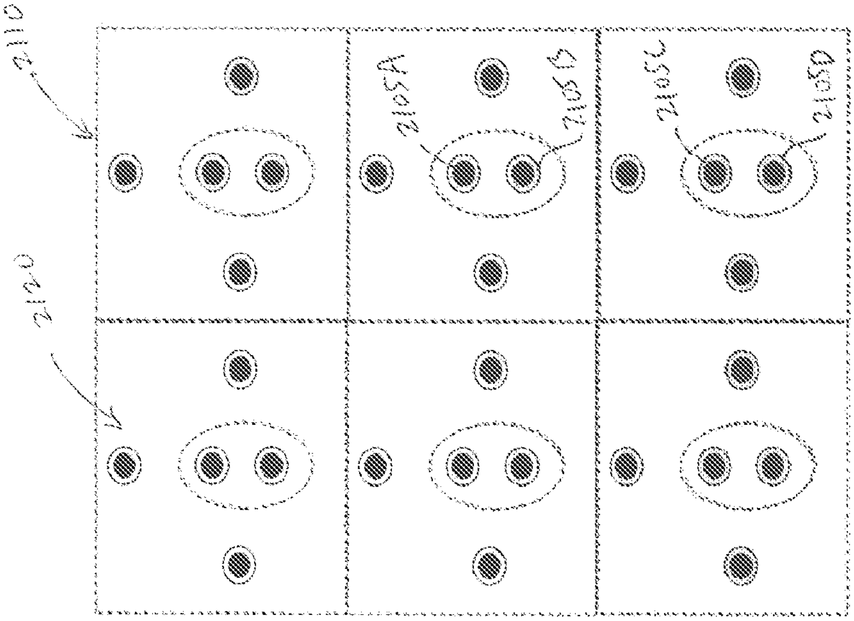

As described above, the broadside to edge coupling, despite having the possibility of creating undesired signal effects, provides advantages in terms of density of an interconnection system. One such advantage is that edge coupling of the mating contact tails may facilitate routing of traces in a printed circuit board to the contact tails of the connector. FIGS. 17A and 17B illustrate a portion of a connector "footprint" where a connector may be mounted to a printed circuit board. In this configuration, because the broad sides of the conductive elements are parallel with the Y-axis, the contact tails are edge-coupled, meaning that edges of the conductive elements are adjacent. In contrast, when broadside coupling is used broad surfaces of the conductive elements are adjacent. Such a configuration may be achieved through a transition region in which the conductive elements have transition regions as described above.

Providing edge coupling of contact tails may provide routing channels within a printed circuit board to which a connector is attached. In embodiments of connectors as described above, the signal contact tails in a column are aligned in the Y-direction. When vias are formed in a daughter card to receive contact tails, those vias will similarly be aligned in a column in the Y-direction. That direction may correspond to the direction in which traces are routed from electronics attached to the printed circuit board to a connector at the edge of the board. Examples of vias (e.g., vias 2105A-C) disposed in columns (e.g., columns 2110 and 2120) on a printed circuit board, and the routing channels between the columns are shown in FIG. 17A, in accordance with some embodiments. Examples of traces (e.g., traces 2115A-D) running in these routing channels (e.g., channel 2130) are illustrated in FIG. 17B, in accordance with some embodiments. Having routing channels as illustrated in FIG. 17B may allow traces for multiple pairs (e.g., the pair 2115A-B and the pair 2115C-D) to be routed on the same layer of the printed circuit board. If more pairs are routed on the same level, the number of layers in the printed circuit board may be reduced, which can reduce the overall cost of the electronic assembly.

FIGS. 17A and 17B illustrate a portion of a footprint for a connector formed of modules. In this embodiment, each module has the same orientation of signal and reference conductor contact tails, and therefore the same pattern of vias. Accordingly, the footprint illustrated in FIGS. 17A and 17B corresponds to 6 modules of a connector. Each module has a pair of signal conductors, each conductor of the pair having a contact tail, and reference conductors collectively providing four contact tails.

Figure 18:
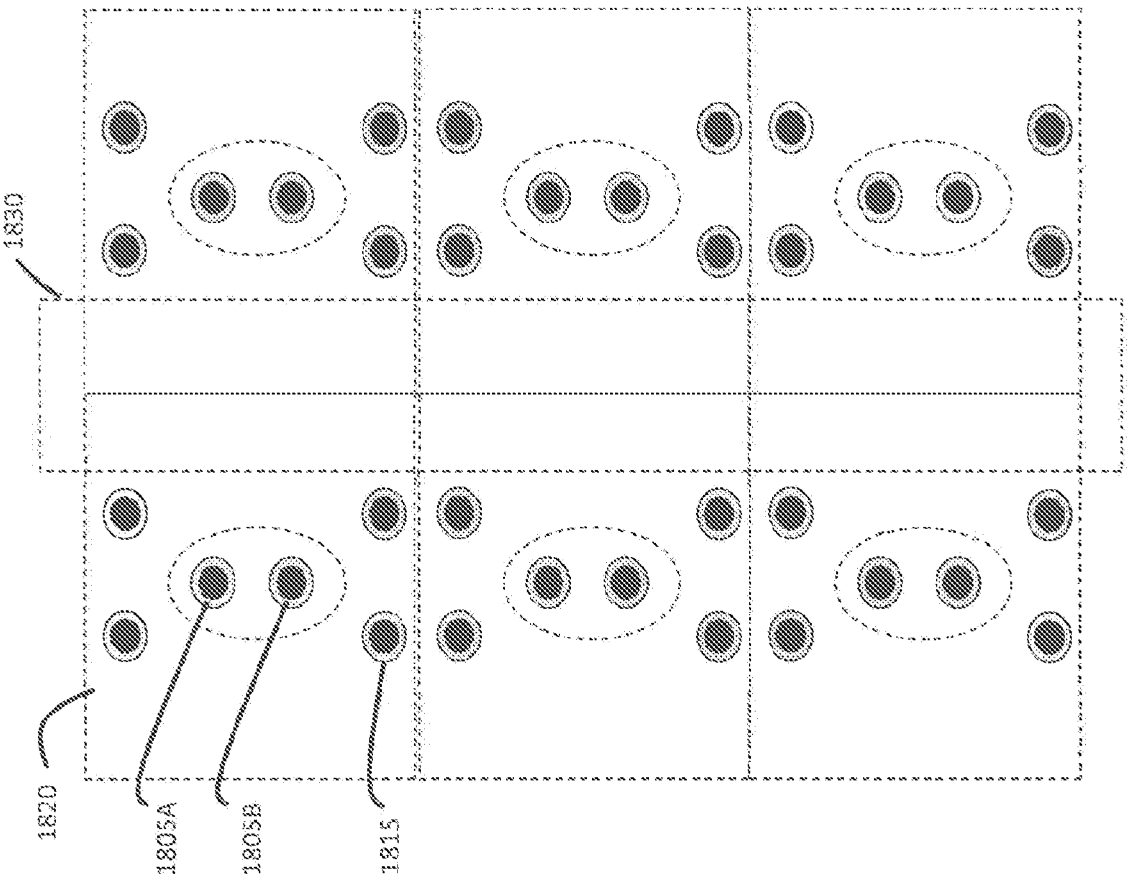
FIG. 18 is an alternative embodiment of a connector footprint with wide routing channels.

FIG. 18 illustrates an alternative pattern of contact tails for the reference conductors. The pattern of FIG. 18 may correspond to the pattern illustrated, for example, in FIG. 8. FIG. 18 shows a footprint 1820 for one module. Similar patterns of vias are shown to receive contact tails from other modules, but are not numbered d for simplicity.

Footprint 1820 includes a pair of vias 1805A and 1805B positioned to receive contact tails from a pair of signal conductors. Four ground vias, of which ground via 1815 is numbered, are shown around the pair. Here, the ground vias are at opposing ends of the pair of signal vias, with two ground vias on each end. This pattern concentrates the vias in columns, aligned with the column direction of the connector, with routing channel 1830 between columns. This configuration, too, provides relatively wide routing channels within a printed circuit board so that a high density interconnection system may be achieved, with desirable performance.

Although details of specific configurations of conductive elements, housings, and shield members are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. For example, examples of techniques are described for improving signal quality at the mating interface of an electrical interconnection system. These techniques may be used alone or in any suitable combination. Furthermore, the size of a connector may be increased or decreased from what is shown. Also, it is possible that materials other than those expressly mentioned may be used to construct the connector. As another example, connectors with four differential signal pairs in a column are used for illustrative purposes only. Any desired number of signal conductors may be used in a connector.

Manufacturing techniques may also be varied. For example, embodiments are described in which the daughtercard connector 600 is formed by organizing a plurality of wafers onto a stiffener. It may be possible that an equivalent structure may be formed by inserting a plurality of shield pieces and signal receptacles into a molded housing.

As another example, connectors are described that are formed of modules, each of which contains one pair of signal conductors. It is not necessary that each module contain exactly one pair or that the number of signal pairs be the same in all modules in a connector. For example, a 2-pair or 3-pair module may be formed. Moreover, in some embodiments, a core module may be formed that has two, three, four, five, six, or some greater number of rows in a single-ended or differential pair configuration. Each connector, or each wafer in embodiments in which the connector is waferized, may include such a core module. To make a connector with more rows than are included in the base module, additional modules (e.g., each with a smaller number of pairs such as a single pair per module) may be coupled to the core module.

In some embodiments, greater density may be achieved with edge coupling at the end portions of the signal conductors, such as the mating interface and/or contact tails of signal conductors forming the differential pair. A signal conductor transition region, transitioning between broadside and edge coupling, between an intermediate portion of the signal conductors and the contact tails and/or mating contact portions may be provided. In some embodiments, the transition region may be configured to provide greater signal integrity.

In accordance with some embodiments, a connector module may comprise reference conductors totally or partially surrounding a pair of signal conductors. The reference conductors provide an enclosure around the signal conductors. One or more techniques may be used to avoid or suppress undesired modes of propagation within the enclosure.

Accordingly, some embodiments may relate to an electrical connector comprising a pair of signal conductors comprising a first signal conductor and the second signal conductor. Each of the first signal conductor and the second signal conductor may comprise a plurality of end portions, comprising at least a first end portion and a second end portion. Each of the first signal conductor and the second signal conductor also may comprise a contact tail formed at the first end portion, a mating contact portion formed at the second end portion, and an intermediate portion joining the first end portion and the second end portion. The conductors of the pair may be configured such that the intermediate portion of the first signal conductor is adjacent to and parallel to the intermediate portion of the second signal conductor so as to provide broadside coupling between the intermediate portions of the first signal conductor and the second signal conductor. The end portion of the plurality of end portions of the first signal conductor may be disposed adjacent to an end portion of the plurality of end portions of the second signal conductor so as to provide edge coupling between said end portion of the first signal conductor and said end portion of the second signal conductor.

Other embodiments may relate to an electrical connector comprising a plurality of modules and electromagnetic shielding material. Each of the plurality of modules comprising an insulative portion and at least one conductive element. The insulative portions may separate the at least one conductive element from the electromagnetic shielding material. The plurality of modules may be disposed in a two-dimensional array. The shielding material may separate adjacent modules of the plurality of modules; the at least one conductive element is a pair of conductive elements configured to carry a differential signal. Each conductive element in the pair of conductive elements may comprise an intermediate portion. The conductive elements of the pair may be positioned for broadside coupling over at least the intermediate portions.

Furthermore, although many inventive aspects are shown and described with reference to a daughterboard connector having a right angle configuration, it should be appreciated that aspects of the present disclosure is not limited in this regard, as any of the inventive concepts, whether alone or in combination with one or more other inventive concepts, may be used in other types of electrical connectors, such as backplane connectors, cable connectors, stacking connectors, mezzanine connectors, I/O connectors, chip sockets, etc.

In some embodiments, contact tails were illustrated as press fit "eye of the needle" compliant sections that are designed to fit within vias of printed circuit boards. However, other configurations may also be used, such as surface mount elements, spring contacts, solderable pins, etc., as aspects of the present disclosure are not limited to the use of any particular mechanism for attaching connectors to printed circuit boards.

The present disclosure is not limited to the details of construction or the arrangements of components set forth in the following description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. An electrical connector, comprising:

a plurality of pairs of signal conductors disposed in a plurality of parallel columns, each pair of the plurality of pairs of signal conductors comprising:
- a pair of mating contact portions;
- a pair of contact tails; and
- a pair of intermediate portions coupling the pair of mating contact portions to the pair of contact tails, respectively; and a plurality of reference conductors arranged to form at least a partial enclosure of each of the plurality of pairs of signal conductors, each of the at least partial enclosures having a smaller cross-sectional area at the pair of intermediate portions than at the pair of mating contact portions, wherein a largest dimension of the at least partial enclosure at the pair of intermediate portions is smaller than a largest dimension of the at least partial enclosure at the pair of mating contact portions, and wherein the at least partial enclosure comprises a waveguide structure that supports an electromagnetic propagation mode at a frequency based on the largest dimension of the at least partial enclosure.

2. The electrical connector of claim 1, wherein each pair of the plurality of pairs of signal conductors comprises a transition region at which the pair of signal conductors transition from the pair of intermediate portions to the pair of mating contact portions, and the at least partial enclosure comprises a transition region at the transition region of the pair of signal conductors.

3. The electrical connector of claim 2, wherein the pair of intermediate portions are spaced from one another in a first direction and the pair of mating contact portions are spaced from one another in a second direction transverse to the first direction.

4. The electrical connector of claim 3, wherein:

the pair of mating contact portions extend in a mating direction;

at the pair of mating contact portions, the at least partial enclosure comprises a first dimension and a second dimension that are transverse to the mating direction;

the second dimension is transverse to and smaller than the first dimension; and the first direction is transverse to the second dimension of the at least partial enclosure.

5. The electrical connector of claim 4, wherein the first direction is orthogonal to the second dimension of the at least partial enclosure.

6. The electrical connector of claim 1, wherein the pair of intermediate portions comprise first portions extending in a first direction and second portions extending in a second direction that is orthogonal to the first direction.

7. The electrical connector of claim 1, wherein, each of the at least partial enclosures of the plurality of reference conductors comprises, at the pair of intermediate portions, a first concave conductive member on a first side and a second concave conductive member on a second side that is electrically connected to the first concave conductive member.

8. An electrical connector, comprising:

a plurality of pairs of signal conductors disposed in a plurality of parallel columns, each pair of the plurality of pairs of signal conductors comprising:
- a pair of mating contact portions;
- a pair of contact tails; and a pair of intermediate portions coupling the pair of mating contact portions to the pair of contact tails, respectively; and a plurality of reference conductors arranged to form at least a partial enclosure of each of the plurality of pairs of signal conductors, each of the at least partial enclosures having a smaller cross-sectional area at the pair of intermediate portions than at the pair of mating contact portions, wherein each pair of the plurality of pairs of signal conductors comprises a transition region at which the pair of signal conductors transition from the pair of intermediate portions to the pair of mating contact portions, and the at least partial enclosure comprises a transition region at the transition region of the pair of signal conductors, and wherein the transition region of the at least partial enclosure comprises lossy material.

9. The electrical connector of claim 8, wherein a largest dimension of the at least partial enclosure at the pair of intermediate portions is smaller than a largest dimension of the at least partial enclosure at the pair of mating contact portions.

10. The electrical connector of claim 9, wherein the at least partial enclosure comprises a waveguide structure that supports an electromagnetic propagation mode at a frequency based on the largest dimension of the at least partial enclosure.

11. The electrical connector of claim 9, wherein the largest dimension of the at least partial enclosure at the pair of intermediate portions is smaller than a largest dimension of the at least partial enclosure at the pair of contact tails.

12. An electrical connector, comprising:

a plurality of pairs of signal conductors, each pair of signal conductors comprising:

a pair of mating contact portions;

a pair of contact tails; and a pair of intermediate portions coupling the pair of mating contact portions to the pair of contact tails, respectively, wherein the pair of intermediate portions comprise first portions that are proximate the pair of mating contact portions and second portions that are proximate the pair of contact tails, the first portions extending in a first direction and the second portions extending in a second direction that is orthogonal to the first direction; and a plurality of electromagnetic shielding members disposed between adjacent pairs of the plurality of pairs of signal conductors and extending from the pair of contact tails to the pair of mating contact portions, wherein each of the plurality of electromagnetic shielding members is wider at the pair of mating contact portions than at the pair of intermediate portions, wherein the pair of intermediate portions of each pair of signal conductors have a first orientation and the pair of mating contact portions of each pair of signal conductors have a second orientation different from the first orientation, and the plurality of electromagnetic shielding members have widening transition regions from the pairs of intermediate portions to the pairs of mating contact portions, and wherein the first orientation of the pairs of intermediate portions comprises broadside coupling, and the second orientation of the mating contact portions does not comprise broadside coupling.

13. The electrical connector of claim 12, wherein a largest dimension of each of the plurality of electromagnetic shielding members at the pair of intermediate portions is smaller than a largest dimension of each of the plurality of electromagnetic shielding members at the pair of mating contact portions.

14. The electrical connector of claim 13, wherein:

the largest dimension of each of the plurality of electromagnetic shielding members at the pair of mating contact portions is parallel to a direction in which the pair of mating contact portions are separated from one another; and each dimension of the plurality of electromagnetic shielding members at the pair of intermediate portions that is orthogonal to a direction of elongation of the pair of intermediate portions is smaller than the largest dimension of each of the plurality of electromagnetic shielding members at the pair of mating contact portions.

15. The electrical connector of claim 13, wherein each of the plurality of electromagnetic shielding members comprises an at least partial enclosure around a respective pair of signal conductors of the plurality of pairs of signal conductors.

16. The electrical connector of claim 15, wherein each of the plurality of electromagnetic shielding members comprises at least a first conductor and a second conductor attached to the first conductor so as to at least partially enclose the respective pair of signal conductors between the first and second conductors.

17. The electrical connector of claim 15, wherein the largest dimension of each of the plurality of electromagnetic shielding members at the pair of intermediate portions is smaller than a largest dimension of each of the plurality of electromagnetic shielding members at the pair of contact tails.

18. An electrical connector, comprising:

a plurality of pairs of signal conductors, each pair of signal conductors comprising:

a pair of mating contact portions;

a pair of contact tails; and a pair of intermediate portions coupling the pair of mating contact portions to the pair of contact tails, respectively, wherein the pair of intermediate portions comprise first portions that are proximate the pair of mating contact portions and second portions that are proximate the pair of contact tails, wherein the first portions extend in a first direction and the second portions extend in a second direction that is orthogonal to the first direction; and a plurality of electromagnetic shielding members disposed between adjacent pairs of the plurality of pairs of signal conductors and extending from the pair of contact tails to the pair of mating contact portions, wherein each of the plurality of electromagnetic shielding members is wider at the pair of mating contact portions than at the pair of intermediate portions, wherein a largest dimension of each of the plurality of electromagnetic shielding members at the pair of intermediate portions is smaller than a largest dimension of each of the plurality of electromagnetic shielding members at the pair of mating contact portions, wherein each of the plurality of electromagnetic shielding members comprises an at least partial enclosure around a respective pair of signal conductors of the plurality of pairs of signal conductors, and wherein the at least partial enclosure comprises a waveguide structure that supports an electromagnetic propagation mode at a frequency based on the largest dimension of the at least partial enclosure.

19. The electrical connector of claim 18, wherein the pair of intermediate portions of each pair of signal conductors have a first orientation and the pair of mating contact portions of each pair of signal conductors have a second orientation different from the first orientation, and the plurality of electromagnetic shielding members have widening transition regions from the pairs of intermediate portions to the pairs of mating contact portions.

20. The electrical connector of claim 19, wherein the first orientation of the pairs of intermediate portions comprises broadside coupling, and the second orientation of the mating contact portions does not comprise broadside coupling.

21. The electrical connector of claim 19, wherein the first orientation of the pairs of intermediate portions comprises a separation between the pair of intermediate portions in a third direction and a separation between the pair of mating contact portions in a fourth direction that is transverse to the third direction.

22. An electrical connector, comprising:

a first plurality of pairs of signal conductors arranged in a first column extending along a column direction;

a second plurality of pairs of signal conductors arranged in a second column extending along the column direction, the second column spaced from the first column in a row direction orthogonal to the column direction;

at least one first reference conductor at least partially enclosing a first pair of signal conductors of the first plurality of pairs of signal conductors;

at least one second reference conductor at least partially enclosing a second pair of signal conductors of the second plurality of pairs of signal conductors; and a conductively-coated plastic member electrically coupling the at least one first reference conductor and the at least one second reference conductor.

23. The electrical connector of claim 22, wherein the first plurality of pairs of signal conductors and the second plurality of pairs of signal conductors comprise:

mating contact portions exposed at a mating face of the electrical connector;

contact tails exposed at a mounting face of the electrical connector that is perpendicular to the mating face; and intermediate portions connecting the mating contact portions to the contact tails.

24. The electrical connector of claim 23, wherein:

at each of the mating face and the mounting face, the first plurality of pairs of signal conductors are spaced from the second plurality of pairs of signal conductors in the row direction.

25. The electrical connector of claim 24, wherein each pair of the first plurality of pairs of signal conductors and the second plurality of pairs of signal conductors comprises, at the mating face:

a first mating contact portion; and a second mating contact portion spaced from the first mating contact portion in the column direction.

26. The electrical connector of claim 24, wherein each pair of the first plurality of pairs of signal conductors and the second plurality of pairs of signal conductors comprises, at the mounting face:

a first contact tail; and a second contact tail spaced from the first signal conductor in the column direction.

27. The electrical connector of claim 26, wherein:

the at least one first reference conductor comprises, at the mounting face, a first plurality of reference tails disposed between adjacent pairs of contact tails of the first plurality of pairs of signal conductors; and the at least one second reference conductor comprises, at the mounting face, a second plurality of reference tails disposed between adjacent pairs of contact tails of the second plurality of pairs of signal conductors in the column direction.

28. The electrical connector of claim 23, wherein, in each of the first plurality of pairs of signal conductors and the second plurality of pairs of signal conductors:

the mating contact portions are edge coupled to one another; and the contact tails are edge coupled to one another.

29. The electrical connector of claim 23, wherein:

the intermediate portions of the first pair of signal conductors comprise first portions elongated in a direction perpendicular to the mating face of the electrical connector;

the intermediate portions of the second pair of signal conductors comprise second portions elongated in the direction perpendicular to the mating face of the electrical connector;

a first portion of the at least one first reference conductor at least partially encloses the first portions of the intermediate portions of the first pair the signal conductors;

a second portion of the at least one second reference conductor at least partially encloses the second portions of the intermediate portions of the second pair of signal conductors; and the conductively-coated plastic member is disposed, at least in part, between the first portion of the at least one first reference conductor and the second portion of the at least one second reference conductor.

30. The electrical connector of claim 23, wherein:

the at least one first reference conductor comprises:

a first reference conductor disposed on a first side of the first pair of signal conductors; and a second reference conductor disposed on a second side of the first pair of signal conductors opposite the first side in the row direction, electrically connected to the first reference conductor, and forming an at least partial enclosure of the first pair of signal conductors together with the first reference conductor; and the at least one second reference conductor comprises:

a third reference conductor disposed on a first side of the second pair of signal conductors; and a fourth reference conductor disposed on a second side of the second pair of signal conductors opposite the first side in the row direction, electrically connected to the third reference conductor, and forming an at least partial enclosure of the second pair of signal conductors together with the third reference conductor.

31. The electrical connector of claim 30, wherein:

the first reference conductor and the second reference conductor comprise opposing U-shaped shells that are electrically connected to one another and cooperate to form the at least partial enclosure of the first pair of signal conductors; and the third reference conductor and the fourth reference conductor comprise opposing U-shaped shells that are electrically connected to one another and cooperate to form the at least partial enclosure of the second pair of signal conductors.

32. The electrical connector of claim 30, wherein each of the at least partial enclosure of the first pair of signal conductors and the at least partial enclosure of the second pair of signal conductors is at least twice as wide in the column direction as in the row direction.

33. The electrical connector of claim 32, wherein each of the at least partial enclosure of the first pair of signal conductors and the at least partial enclosure of the second pair of signal conductors is at least three times as wide in the column direction as in the row direction.

34. The electrical connector of claim 30, wherein:

the first and second reference conductors provide angular coverage of the first pair of signal conductors in a range between 270 degrees and 365 degrees; and the third and fourth reference conductors provide angular coverage of the second pair of signal conductors in a range between 270 degrees and 365 degrees.

35. The electrical connector of claim 30, wherein:

the at least partial enclosure of the first pair of signal conductors provides shielding coverage over more than 80% of lengths of the intermediate portions of the first pair of signal conductors; and the at least partial enclosure of the second pair of signal conductors provides shielding coverage over more than 80% of lengths of the intermediate portions of the second pair of signal conductors.

36. The electrical connector of claim 30, wherein:

the at least one first reference conductor forms a first plurality of at least partial enclosures around respective pairs of the first plurality of pairs of signal conductors, the first plurality of at least partial enclosures comprising the at least partial enclosure of the first pair of signal conductors;

the at least one second reference conductor forms a second plurality of at least partial enclosures around respective pairs of the second plurality of pairs of signal conductors, the second plurality of at least partial enclosures comprising the at least partial enclosure of the second pair of signal conductors; and the conductively-coated plastic member is electrically coupled to each of the first plurality of at least partial enclosures and the second plurality of at least partial enclosures.

37. The electrical connector of claim 23, wherein the conductively-coated plastic member is disposed between the intermediate portions of the first plurality of pairs of signal conductors and the intermediate portions of the second plurality of pairs of signal conductors and between the at least one first reference conductor and the at least one second reference conductor.

38. The electrical connector of claim 37, further comprising:

a third plurality of pairs of signal conductors arranged in a third column extending along the column direction and spaced from the second column in the row direction, the third plurality of pairs of signal conductors comprising:

mating contact portions exposed at the mating face of the electrical connector;

contact tails exposed at the mounting face of the electrical connector; and intermediate portions connecting the mating contact portions to the contact tails;

at least one third reference conductor that at least partially encloses a third pair of signal conductors of the third plurality of signal conductors, wherein the conductively-coated plastic member is further disposed between the intermediate portions of the second plurality of pairs of signal conductors and the intermediate portions of the third plurality of pairs of signal conductors and between the at least one second reference conductor and the at least one third reference conductor.

39. The electrical connector of claim 22, wherein the conductively coated plastic member is directly electrically coupled to the at least one first reference conductor and/or the at least one second reference conductor.

40. The electrical connector of claim 39, wherein the conductively coated plastic member is directly electrically coupled to the at least one first reference conductor and the at least one second reference conductor.

* * * * *